United States Patent
Hashimoto

(10) Patent No.: US 7,831,530 B2
(45) Date of Patent: Nov. 9, 2010

(54) OPTIMIZING METHOD OF LEARNING DATA SET FOR SIGNAL DISCRIMINATION APPARATUS AND SIGNAL DISCRIMINATION APPARATUS CAPABLE OF OPTIMIZING LEARNING DATA SET BY USING A NEURAL NETWORK

(75) Inventor: Yoshihito Hashimoto, Amagasaki (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 24 days.

(21) Appl. No.: 12/309,773

(22) PCT Filed: Aug. 2, 2007

(86) PCT No.: PCT/JP2007/065172

§ 371 (c)(1), (2), (4) Date: Jan. 29, 2009

(87) PCT Pub. No.: WO2008/016109

PCT Pub. Date: Feb. 7, 2008

(65) Prior Publication Data

US 2009/0240641 A1    Sep. 24, 2009

(30) Foreign Application Priority Data

Aug. 3, 2006 (JP) ............................. 2006-212436
Aug. 3, 2006 (JP) ............................. 2006-212437
Aug. 29, 2006 (JP) ............................. 2006-232575

(51) Int. Cl.
*G06E 1/00* (2006.01)
(52) U.S. Cl. ....................................................... 706/20
(58) Field of Classification Search .............. 706/15–25

See application file for complete search history.

(56) References Cited

U.S. PATENT DOCUMENTS 5,621,815 A * 4/1997 Talukdar et al. ............. 382/159

(Continued)

FOREIGN PATENT DOCUMENTS

JP            4-092955            3/1992

(Continued)

OTHER PUBLICATIONS

Yang et al., A Study on Retrospective and On-line Event Detection, 1998, ACM, pp. 1-9.*

(Continued)

*Primary Examiner*—David R Vincent
(74) *Attorney, Agent, or Firm*—Edwards, Angell, Palmer & Dodge

(57) ABSTRACT

A method of the present invention is processed by a selector. The selector selects each member constituting a learning data set from a data set source. Each member of the source is feature data extracted through a transducer and assigned to any one of categories in advance. The selector calculates each member's divergence degree of the source to obtain an average divergence degree. If an output neuron of the output layer of a neural network is related to different categories of all the categories represented by the output layer, the selector includes every member of the source corresponding to the category of the minimum average divergence degree in the selection from the source to the learning data set. The selector also excludes, from the selection, every member of the source corresponding to every remaining category of the different categories.

2 Claims, 17 Drawing Sheets

U.S. PATENT DOCUMENTS

| | | | | |
|---|---|---|---|---|
| 5,966,688 | A | * | 10/1999 | Nandkumar et al. ........ 704/222 |
| 7,251,637 | B1 | * | 7/2007 | Caid et al. .................... 706/15 |
| 2003/0112713 | A1 | * | 6/2003 | Kaelin ........................ 368/281 |
| 2003/0225464 | A1 | * | 12/2003 | Ueda et al. .................... 700/47 |
| 2005/0100209 | A1 | * | 5/2005 | Lewis et al. ................. 382/159 |
| 2006/0179018 | A1 | * | 8/2006 | Messmer et al. .............. 706/16 |

FOREIGN PATENT DOCUMENTS

| | | |
|---|---|---|
| JP | 09-034861 | 2/1997 |
| JP | 2004-354111 | 12/2004 |
| JP | 2005-115569 | 4/2005 |
| JP | 2006-072659 | 3/2006 |

OTHER PUBLICATIONS

International Search Report, Nov. 20, 2007, issued in PCT/JP2007/065172.

Ikeda et al., "Automated Sensory Inspection Based on Vibration and Acoustic Information," Jun. 20, 2006, vol. 54, No. 2, pp. 42-48.

\* cited by examiner

FIG. 11A
FIRST FEATURE DATA (5, 6, 7, 8)
SECOND FEATURE DATA (9, 8, 8, 10)
THIRD FEATURE DATA (6, 7, 9, 12)
FOURTH FEATURE DATA (7, 5, 11, 15)
FIG. 11B
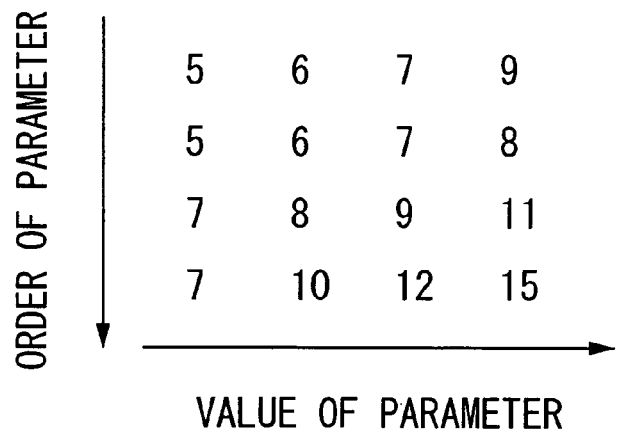
FIG. 11C
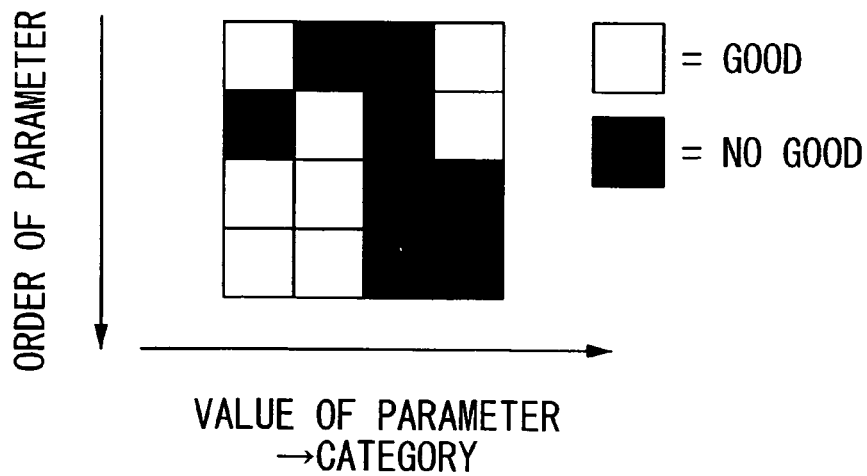

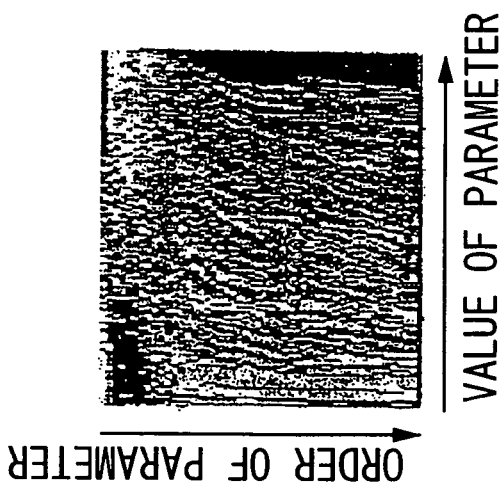
FIG. 18A
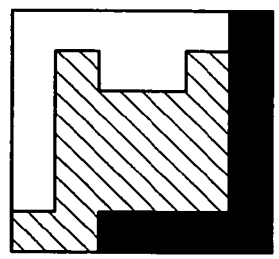
CLUSTERING MAP
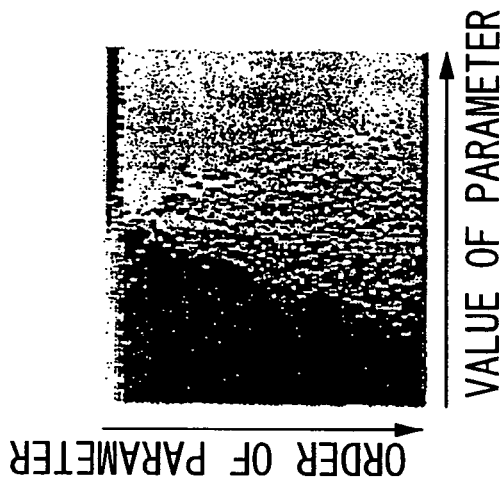
FIG. 18B
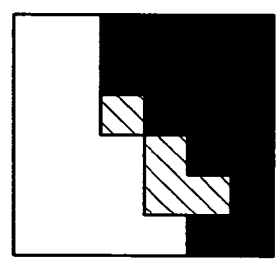
CLUSTERING MAP
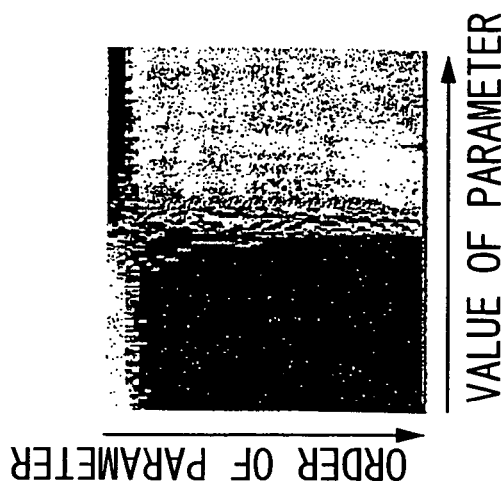
FIG. 18C
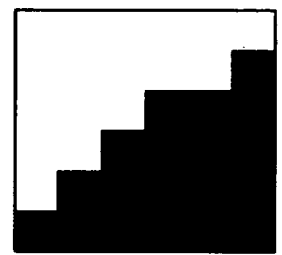
CLUSTERING MAP

OPTIMIZING METHOD OF LEARNING DATA SET FOR SIGNAL DISCRIMINATION APPARATUS AND SIGNAL DISCRIMINATION APPARATUS CAPABLE OF OPTIMIZING LEARNING DATA SET BY USING A NEURAL NETWORK

TECHNICAL FIELD

The invention relates generally to signal discrimination methods and apparatus and, more particularly, to an optimizing method of a learning data set for signal discrimination apparatus and signal discrimination apparatus capable of optimizing a learning data set.

BACKGROUND ART

Japanese Patent Application Publication Number 2004-354111 published on Dec. 16, 2004 discloses object inspection method and apparatus (hereinafter referred to as a "first prior art"). The apparatus has a measuring device (sensor, microphone, etc.), a transducer, a competitive learning neural network, a display device and so on, and operates in either a learning mode or an inspecting mode. In the learning mode, the apparatus utilizes a learning data set that is a collection of data. Each member of the set is obtained by that the measuring device obtains a measurement signal from a measuring object and then the transducer extracts a feature (i.e., feature data) from the signal. Each member of the set is also assigned by a user to any one of assumed categories. Subsequently, a clustering map is made by sequentially entering each member of the learning data set into the network. All elements constituting the map correspond one-on-one to all output neurons constituting an output layer of the network. In the inspecting mode, if the feature data extracted through the transducer is entered into the network, the network judges the category of the data to specify a position of the category on the map. The display device then shows the clustering map and the position of the category. Accordingly, the measurement result (i.e., the category of the feature data obtained from the measurement signal) can be recognized visually.

Japanese Patent Application Publication Number 2005-115569 published on Apr. 28, 2005 discloses signal discrimination apparatus and method (hereinafter referred to as a "second prior art"). The apparatus has a competitive learning neural network, a display device and so on in the same way as the first prior art, and further has a signal processor located between a measuring device and the network. The processor is formed of a filter and a transducer.

The filter is configured to operate in any mode of a pass-through mode, an envelope (curve) mode, an FIR (finite impulse response) mode, a Wavelet transformation mode and a cepstrum mode. In the pass-through mode, the measurement signal from the measuring device is transmitted to the transducer without signal processing. In the envelope mode, envelope components are extracted from the measurement signal in response to a suitable time constant (cut-off frequency) and then transmitted to the transducer. In the FIR mode, signal components within a specified range are extracted from the measurement signal like a band-pass filter and then transmitted to the transducer. In the Wavelet transformation mode, based on the Wavelet transformation, frequency components corresponding to Wavelet coefficients equal to or less than a specified threshold are removed from the measurement signal transmitted to the transducer. In the cepstrum mode, based on the cepstrum analysis, power components equal to or less than a specified threshold are removed from the measurement signal transmitted to the transducer.

The transducer of the second prior art is configured to operate in any mode of a projection wave form mode, an FFT (fast Fourier transform) mode, an FFT+Wavelet transformation mode, a probability density function mode and an effective value mode to extract a feature (i.e., feature data) from the output of the filter. In the projection wave form mode, the feature is extracted by integrating signal amplitude from the filter based on a window function. In the FFT mode, the feature is extracted by calculating Fourier coefficients based on the fast Fourier transform. In the FFT+Wavelet transformation mode, the feature is extracted by wavelet-transforming a frequency distribution pattern obtained from the fast Fourier transform. In the probability density function mode, the feature is extracted by working out a probability density function. In the effective value mode, the feature is extracted by working out an effective value.

In a learning mode or the like, the signal discrimination apparatus calculates each accuracy of all combinations of filter and transducer modes and ranks each combination according to accuracy order. Prior to an inspecting mode, the apparatus selects one combination corresponding to the highest accuracy from some combinations of filter and transducer modes selected by a user, and sets the signal processor to the selected combination mode.

Japanese Patent Application Publication Number 2006-072659 published Mar. 16, 2006 discloses signal discrimination method and apparatus (hereinafter referred to as a "third prior art"). The apparatus has a measuring device, a competitive learning neural network, a display device and so on in the same way as the first prior art, and further has a transducer located between the measuring device and the network. The transducer is configured to extract a feature (i.e., feature data) from at least one extraction range. For example, the transducer extracts a feature from the components in an extraction range of the measurement signal obtained through the measuring device, or extracts a feature from the measurement signal to further extract a feature in an extraction range. The apparatus changes the upper and lower limits of each specified range for determining the at least one extraction range, and then calculates accuracy of category classification of the feature data every specified range. The apparatus then sets one or more specified ranges corresponding to the highest accuracy to the at least one extraction range of the transducer.

In the second and third prior arts, the accuracy of category judgment of the feature data can be improved by adjusting a combination of modes of the signal processor or adjusting at least one extraction range for the transducer. However, if an unsuitable learning data set is used, the accuracy of category judgment of the feature data cannot be improved.

DISCLOSURE OF THE INVENTION

It is therefore an object of the present invention to optimize a learning data set in order to prevent an unsuitable learning data set from being used for signal discrimination apparatus.

A method of the present invention is used for signal discrimination apparatus. The apparatus comprises a transducer and a competitive learning neural network. The transducer is configured to extract feature data including parameters from a measurement signal. The network includes an input layer and an output layer. The input layer has input neurons that correspond one-on-one to the parameters of feature data extracted through the transducer. The output layer has output neurons each of which is coupled to all input neurons of the input layer through weight vectors to be related to any of categories based on a learning data set. In short, the network is configured to relate feature data extracted through the transducer to any output neuron of the output layer to classify into any of the categories.

First to third methods of the present invention are processed by a selector that is further included in the apparatus. The selector is configured to select each member constituting said learning data set from a data set source. Each member of the source is feature data extracted through the transducer and is assigned to any one of the categories, in advance.

The first method comprises a step (A) performed after a preprocess of sequentially entering every member of the source into the network to try to relate each member of the source to any output neuron of the output layer. The step (A) is repeated until each output neuron of the output layer is related to a single category of the categories. The step (A) comprises steps of: (a) judging whether an output neuron of the output layer is related to different categories in all categories represented by the output layer; (b) calculating each member's divergence degree of the source corresponding to the different categories with respect to the output neuron in question if related to the different categories; (c) calculating each average divergence degree of the different categories based on the divergence degree of each member of the source; (d) including every member of the source corresponding to the category of the minimum average divergence degree in the selection from the source to the learning data set; and (e) excluding every member of the source corresponding to every remaining category of the different categories from the selection. In this method, even if a member(s) of which category is wrong is included in the data set source, the member(s) can be deleted automatically. Accordingly, the learning data set can be optimized, and a proper category can be related to each output neuron of the output layer. As a result, the judgment standard after learning can be prevent from being vague.

In an embodiment, each member's divergence degree of the source at the step (b) is magnitude of difference vector between the weight vector on the output neuron in question and the member (vector) in question.

The second method is performed after the preprocess like the first method, and utilizes a divergence degree and an average divergence degree. That is, the second method comprises: a step (A), performed after the preprocess, of calculating each member's divergence degree of the source, which is magnitude of difference vector between the member in question and the weight vector on the output neuron related with the member; and a step (B) repeated until the average and variance of each member's divergence degree included in the source become lower than predetermined average threshold and variance threshold, respectively. The step (B) comprises a step of excluding every member of which divergence degree is greater than a predetermined divergence degree threshold, from the source. In this method, at least one member departing from the other members can be excluded from the data set source. For example, it is possible to exclude feature data that do not belong to the category of good judgment and feature data including environmental sound or noise. Consequently, the learning data set can be optimized. In addition, after the completion of the learning mode based on the optimized learning data set, the signal discrimination apparatus can precisely classify quality of a measuring object in the inspecting mode.

In an enhanced embodiment, the second method further comprises a first preprocess performed prior to a second preprocess as said preprocess. The first preprocess comprises the steps of (a) sequentially entering every member of the source into the network to try to relate each member of the source to any output neuron of the output layer; (b) calculating all distances between a weight vector on each output neuron of the output layer and a weight vector on each of the other output neurons; (c) calculating a minimum distance or a sum distance per output neuron of the output layer based on all the calculated distances; and (d) excluding every member of the source that is related to every output neuron of which minimum distance or sum distance is greater than a minimum distance threshold or a sum distance threshold. For example, in this method, when the minimum distance and the minimum distance threshold are utilized, it is possible to exclude every member of the source related to the category of good judgment that is lower than a similarity level corresponding to the minimum distance threshold. As a result, the feature data belonging to the category of no good can be prevented from being classified into the category of good judgment. When the sum distance and the sum distance threshold are utilized, it is possible to exclude every member of the source related to the category of good judgment that is higher than a variance level corresponding to the sum distance threshold. As a result, the feature data belonging to the category of no good can be prevented from being classified into the category of good judgment.

The third method comprises: a step (A) of calculating all distances between two members of the source on all members of the source; a step (B) of calculating a first average and a first variance of all the calculated distances; and a step (C) performed every member included in the source. The step (C) comprises steps of: (a) selecting a member from the source to temporarily exclude the member from the source; (b) calculating all distances between two members of the source with respect to every remaining member included in the source from which the member is excluded; (c) calculating a second average and a second variance of all the calculated distances; (d) excluding the member in question from the source and setting the second average and the second variance to the first average and the first variance, respectively, if magnitude of change from the first average to the second average or magnitude of change from the first variance to the second variance are greater than predetermined first or second thresholds, respectively and the first average and the first variance are greater than the second average and the second variance, respectively; and (e) returning the member in question to the source if the magnitude of change from the first average to the second average and the magnitude of change from the first variance to the second variance are less than the first and second thresholds, respectively or the first average or the first variance are less than the second average or the second variance, respectively. In this method, for example, feature data belonging to the category of no good judgment can be prevented from being classified into the category of good judgment. As a result, the learning data set can be optimized. Since learning of the network can be omitted from the process of optimizing the learning data, the processing speed is improved.

Fourth and fifth methods of the present invention are processed by a selector that is further included in the apparatus. The selector is configured to select an optimum parameter combination from different parameter sets. The different parameter sets are used for different computing types. Each of the different computing types is used to extract feature data from the measurement signal. Each of the different parameter sets also comprises different parameter combinations.

The fourth method selects an optimum parameter combination from the parameter set used for a previously selected computing type, of the different parameter sets. The fourth method comprises: a step (A) of estimating accuracy of category classification in case of each of the different parameter combinations of the parameter set used for the computing type based on the computing type and the parameter combinations; and a step (B) of selecting said optimum parameter combination based on a result of the step (A). The step (A) comprises a step (a) performed for each of the parameter combinations. The step (a) comprises steps of (i) extracting each feature data assigned to any one of the categories from each measurement signal to produce a data set for accuracy estimation based on the computing type in question and the parameter combination in question; (ii) producing a two-dimensional image by substantially arranging a category corresponding to each parameter of the data set for accuracy estimation along one axis and the other axis on a two-dimensional plane according to order and value of parameter, respectively; and (iii) estimating accuracy of category classification in case of the computing type in question and the parameter combination in question by calculating entropy on a category area corresponding to each element of the two-dimensional image. The step (B) comprises a step of selecting said optimum parameter combination by selecting the parameter combination corresponding to the highest accuracy of each accuracy obtained through the step (A). In this method, the learning data set can be optimized by optimizing each feature data obtained from the transducer.

The fifth method selects an optimum computing type from the different computing types and also selects an optimum parameter combination from the parameter set used for the selected computing type, of the different parameter sets. That is, the fifth method comprises: a step (A) of sequentially selecting computing type from the different computing types; a step (B) of estimating accuracy of category classification in case of different parameter combinations of the parameter set used for the selected computing type based on the selected computing type and the parameter combinations; and a step (C) of selecting said optimum computing type and parameter combination for the computing type based on a result of the steps (A) and (B). The step (B) comprises a step (a) performed for each of the parameter combinations. The step (a) comprises steps of: (i) extracting each feature data assigned to any one of the categories from each measurement signal to produce a data set for accuracy estimation based on the computing type in question and the parameter combination in question; (ii) producing a two-dimensional image by substantially arranging a category corresponding to each parameter of the data set for accuracy estimation along one axis and the other axis on a two-dimensional plane according to order and value of parameter, respectively; and (iii) estimating accuracy of category classification in case of the computing type in question and the parameter combination in question by calculating entropy on a category area corresponding to each element of the two-dimensional image. The step (C) comprises a step of selecting said optimum computing type and the parameter combination for the computing type by selecting the computing type and the parameter combination corresponding to the highest accuracy of each accuracy obtained through the steps (A) and (B). In this method, the learning data set can be optimized by optimizing each feature data obtained from the transducer.

Signal discrimination apparatus capable of optimizing learning data set, of the present invention comprises a transducer and a competitive learning neural network. The transducer is configured to extract feature data including parameters from a measurement signal. The network includes an input layer and an output layer. The input layer has input neurons that correspond one-on-one to the parameters of feature data extracted through the transducer. The output layer has output neurons each of which is coupled to all input neurons of the input layer through weight vectors to be related to any of categories based on a learning data set. In short, the network is configured to relate feature data extracted through the transducer to any output neuron of the output layer to classify into any of the categories. The apparatus further comprises a selector for selecting an optimum parameter combination from the parameter set used for a previously selected computing type, of different parameter sets. The different parameter sets are used for different computing types. Each of the different computing types is used to extract feature data from the measurement signal. Each of the different parameter sets also comprises different parameter combinations. The selector is configured: (A) to estimate accuracy of category classification in case of each of the different parameter combinations of the parameter set used for the computing type based on the computing type and the parameter combinations; and (B) to select said optimum parameter combination based on accuracy of category classification in case of each of the parameter combinations. When estimating the accuracy of category classification, the selector is configured: (a) to extract each feature data assigned to any one of the categories from each measurement signal to produce a data set for accuracy estimation based on the computing type in question and the parameter combination in question; (b) to produce a two-dimensional image by substantially arranging a category corresponding to each parameter of the data set for accuracy estimation along one axis and the other axis on a two-dimensional plane according to order and value of parameter, respectively; and (c) to estimate accuracy of category classification in case of the computing type in question and the parameter combination in question by calculating entropy on a category area corresponding to each element of the two-dimensional image. When selecting said optimum parameter combination, the selector is configured to select said optimum parameter combination by selecting the parameter combination corresponding to the highest accuracy of each accuracy in case of the parameter combinations.

BRIEF DESCRIPTION OF THE DRAWINGS

Preferred embodiments of the invention will now be described in further details. Other features and advantages of the present invention will become better understood with regard to the following detailed description and accompanying drawings where:

FIGS. 11A, 11B and 11C are explanatory diagrams of operation of a selector in the apparatus of FIG. 10;

FIGS. 18A, 18B and 18C are explanatory diagrams of advantage of the apparatus.

BEST MODE FOR CARRYING OUT THE INVENTION

Figure 1:
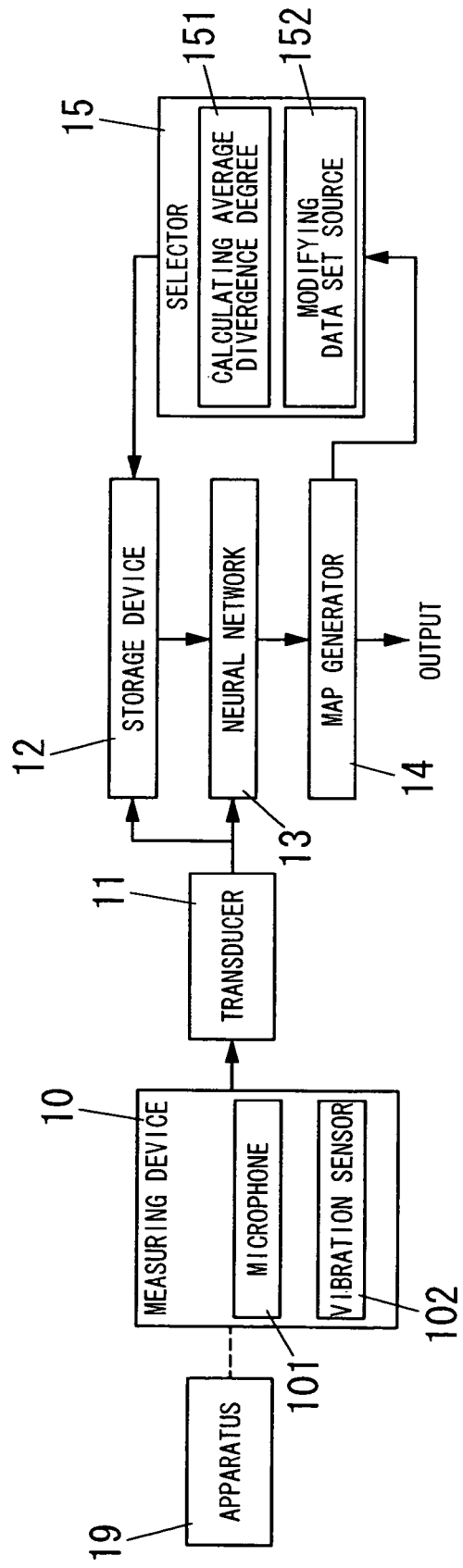
FIG. 1 is a block diagram of signal discrimination apparatus capable of optimizing a learning data set, in accordance with a first embodiment of the present invention.

FIG. 1 shows signal discrimination apparatus capable of optimizing a learning data set, in accordance with a first embodiment of the present invention. The apparatus is formed of a measuring device 10, a transducer 11, a storage device 12, a neural network 13, a map generator 14 and a selector 15, and operates in either a learning mode or an inspecting mode like the first prior art. For example, the apparatus is used to monitor whether or not the operation of apparatus 19 as a measuring object is normal. The apparatus 19 has, for example, a power source such as a motor or the like, but a measuring object of the present invention is not limited to kinds of apparatus.

The measuring device 10 is configured to obtain a measurement signal (e.g., an electric signal) for judging whether or not the operation of the apparatus 19 is normal. For example, the measuring device 10 is formed of a microphone 101 and/or a vibration sensor 102. The microphone 101 detects the operational sound of the apparatus 19 to supply a sound signal to the transducer 11. The sensor 102 detects the operating vibration of the apparatus 19 to supply a vibration signal to the transducer 11. However, not limited to this, the present invention can comprise a measuring device formed of a single device such as a microphone, a vibration sensor, a TV camera, an odor sensor or the like, or a combination of them. A measurement signal in the present invention may also be a signal generated by a measuring object.

The transducer 11 is configured to extract feature data including parameters from the measurement signal. For example, the transducer 11 may be a signal processor formed of a filter and a transducer in the same way as the second prior art. In this instance, the filter can be used to restrict a frequency band of the measurement signal to reduce noise included in the signal. A measurement signal from the measuring device 10 contains vibration components, and accordingly the transducer 11 receives a measurement signal per unit time to convert it into a digital signal. However, not limited to this, in order to receive a measurement signal under the same condition, the transducer 11 may receive a measurement signal based on a timing signal (a trigger signal) synchronizing with the operation of the apparatus 19 or a waveform feature of the measurement signal (e.g., start and end points of a piece of measurement signal). The data obtained from the digital signal are temporarily stored in buffers (not shown) of the transducer 11. The transducer 11 then operates in any mode of different modes like the second prior art to extract a feature (i.e., feature data) from data stored in the buffers. For example, the transducer 11 extracts frequency components suitable for quality judgment of the apparatus 19 through FFT (i.e., feature data (power every frequency band)) to store in the storage device 12 and also supply to the neural network 13. However, not limited to this, the transducer of the present invention may extract frequency components suitable for quality judgment of a measuring object through a filter bank formed of multi band-pass filters.

The storage device 12 is configured to hold various data necessary for the operation of the signal discrimination apparatus. For example, the device 12 comprises a RAM (a random access memory) or the like, and holds each feature data that are extracted through the transducer 11 and constitute a data set source. Each member of the source (i.e., feature data) is assigned to any one of categories used for each apparatus 19. In one example, the device 12 holds optional members (e.g., 150 members) constituting the source. The device 12 also manages each member of the source based on FIFO (first in, first out). However, the data set source may include comparative few members and new members may be suitably added to the source. The device 12 may also hold data set sources.

The neural network 13 is a competitive learning neural network based on competitive unsupervised learning algorithm (SOM (self organizing maps) neural network). The network 13, the map generator 14 and the selector 15 are formed of one or more CPUs (central processing units) and so on. However, the neural network of the present invention may be an exclusive neuro-computer.

Figure 2:
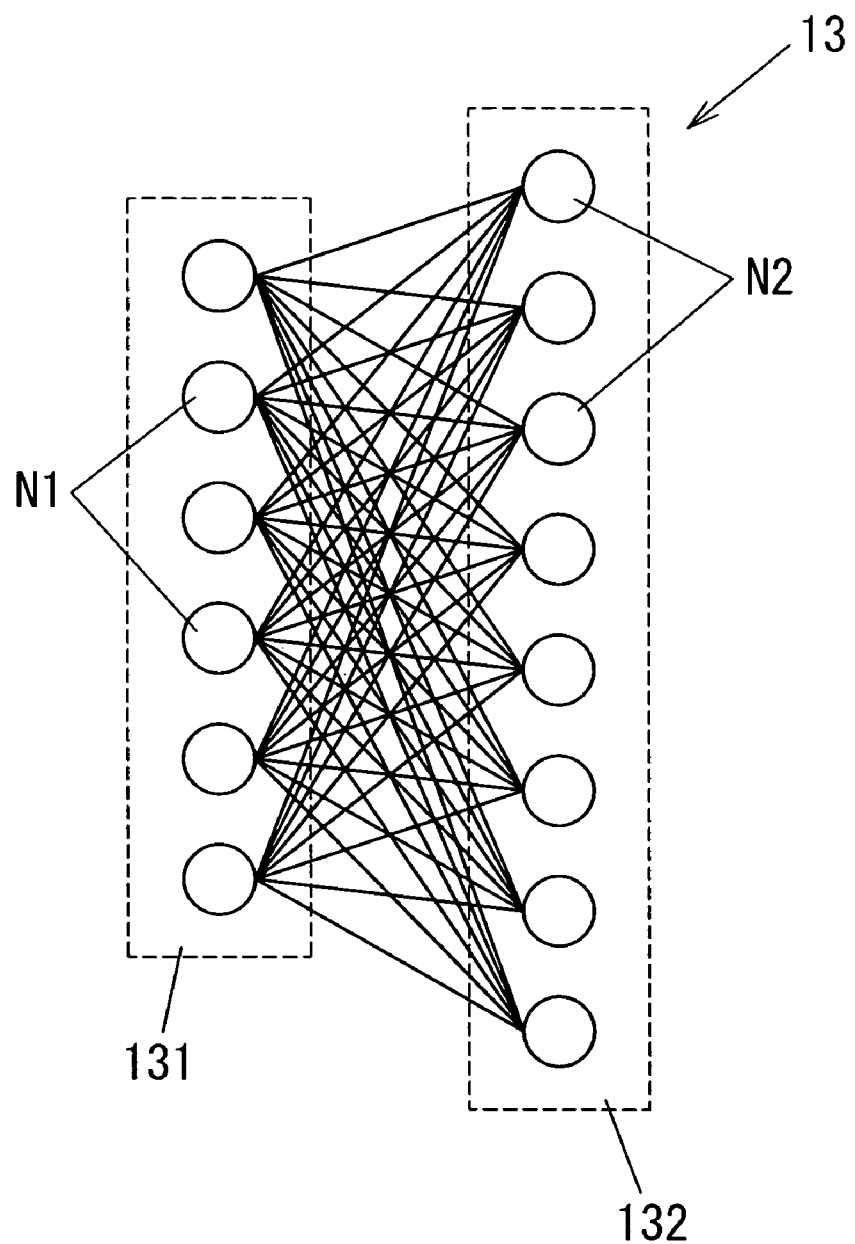
FIG. 2 is an explanatory diagram of a neural network in the apparatus of FIG. 1.

As shown in FIG. 2, the network 13 includes an input layer 131 and an output layer 132. The input layer 131 has variable input neurons (N1) set in response to the number of parameters of feature data from the transducer 11. The input neurons correspond one-on-one to the parameters in feature data extracted through the transducer 11. That is, all input neurons of the input layer 131 correspond one-on-one to all parameters in use. The output layer 132 also has variable output neurons (N2). In the learning mode, each of the output neurons is coupled to all input neurons of the input layer 131 through variable weight vectors (weight coefficients) to be related to any of the categories, based on the learning data set. In the inspecting mode, the network 13 is configured to relate feature data extracted through the transducer 11 to any output neuron of the output layer 132 to classify into any of the categories. In this instance, the feature data are related to the output neuron of which weight vector forms the minimum Euclid distance with the feature data. For example, if the feature data are related to an output neuron assigned to the category of good judgment, the feature data are classified into the category of good judgment. Also, if the feature data are related to an output neuron assigned to the category of no good judgment or related to an output neuron not assigned to the category of good judgment, the feature data are classified into the category of no good judgment. In the first embodiment, categories of good judgment and no good judgment are used. Therefore, if the feature data are related to an output neuron assigned to the category of no good judgment, the feature data are classified into the category of no good judgment.

The map generator 14 produces a clustering map to specify a position of the category classified through the network 13 in the map, like the first prior art. For example, a 6×6 clustering map is produced, and the map and the position of the category are displayed through a display device (not shown). At this point, categories of which attributes display high similarity are arranged at near positions in the clustering map, and therefore clusters are formed.

The selector 15 is configured to select each member constituting said learning data set from the data set source. Each member of the source is feature data held by the storage device 12 and is assigned to any one of the categories in advance. In the first embodiment, each member of the source is to be assigned to either the category of good judgment or the category of no good judgment. However, not limited to this, the data set source of the present invention may be produced by entering various measurement signals produced through simulation into the transducer.

The selector 15 performs a series of operations based on an optimal method for optimizing the learning data set after a preprocess of sequentially entering every member of the source into the network 13 to try to relate each member of the source to any output neuron of the output layer 132. However, the optimal method may include the preprocess. By the way, since a category assigned to each feature data in the learning mode is not always proper, there is a need to optimize the learning data set.

The optimal method is repeated until every output neuron of the output layer 132 is related to a single category of the categories. Based on the optimal method, the selector 15 judges whether an output neuron of the output layer 132 is related to different categories in all categories represented by the output layer 132. In the first embodiment, the selector 15 judges whether an output neuron of the output layer 132 is related to two categories (i.e., the category of good judgment and the category of no good judgment).

If related to the two categories, the selector 15 calculates each member's divergence degree of the source corresponding to the two categories with respect to the output neuron in question. The divergence degree is magnitude of difference vector between the weight vector on the output neuron in question and the member (vector) in question. The divergence degree Y is given by $$Y=([X]/X-[W\text{win}]/W\text{win})^T([X]/X-[W\text{win}]/W\text{win}),$$

where [X] is input data, [Wwin] is a weight vector of the output neuron in question, T shows transpose, and X and Wwin are respectively norms of vectors [X] and [Wwin]. The divergence degree Y is normalized by dividing each vector by its norm.

Figure 3:
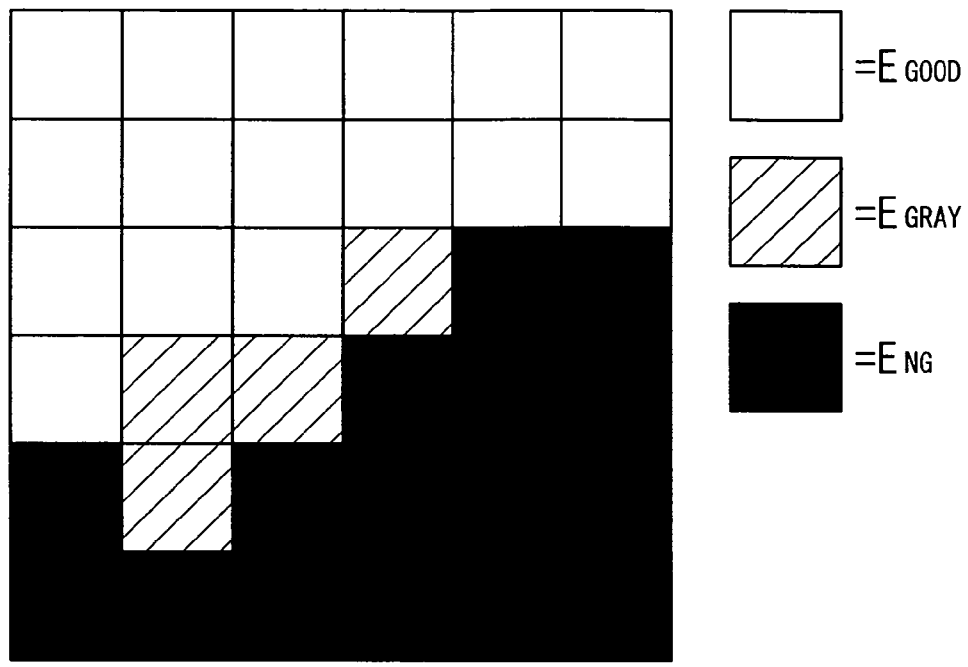
FIG. 3 is an explanatory diagram of operation of a selector in the apparatus of FIG. 1.

Based on each member's divergence degree of the source, the selector 15 calculates each average divergence degree of the two categories (151 in FIG. 1). The selector 15 then includes every member of the source corresponding to the category of the minimum average divergence degree (first category) in the selection from the source to the learning data set. In the first embodiment, every member of the source corresponding to the category of the minimum average divergence degree is remained. The selector 15 also excludes, from the selection, every member of the source corresponding to every remaining category (second category) of the categories (two categories) (152 in FIG. 1). In the first embodiment, every member of the source corresponding to the second category is deleted. For example, as shown in FIG. 3, when a clustering map includes elements ($E_{GRAY}$) related to two categories, each element ($E_{GRAY}$) is modified to any category of the two categories. For example, the selector 15 selects the element of 3rd row and 4th column ($E_{GRAY}$), and calculates a divergence degree every member of the source relating to the element ($E_{GRAY}$). The selector 15 then calculates an average divergence degree (first average divergence degree) of all members of the source belonging to the first category (e.g., the category of good judgment) related to the element ($E_{GRAY}$). For example, if all members of the source belonging to the first category are 0.6, 0.4 and 0.2 in divergence degree, the first average divergence degree becomes 0.40. The selector 15 also calculates an average divergence degree (second average divergence degree) of all members of the source belonging to the second category (the category of no good judgment) related to the element ($E_{GRAY}$). For example, if all members of the source belonging to the second category are 1.1, 0.8 and 1.5 in divergence degree, the second average divergence degree becomes 1.13. If the first average divergence degree is the minimum average divergence degree, the selector 15 deletes every member of the source belonging to the second category. On the contrary, if the second average divergence degree is the minimum average divergence degree, the selector 15 deletes every member of the source belonging to the first category. For example, if the first and second average divergence degrees are 0.40 and 1.13, respectively, every member of the source belonging to the second category is deleted. Similarly, the selector 15 modifies remaining members ($E_{GRAY}$). In addition, though the map includes elements ($E_{GOOD}$) related to a single category of good judgment, every member of the source related to the elements ($E_{GOOD}$) is remained. Though the map includes elements ($E_{NG}$) related to a single category of no good judgment, every member of the source related to the elements ($E_{NG}$) is also remained.

Figure 4:
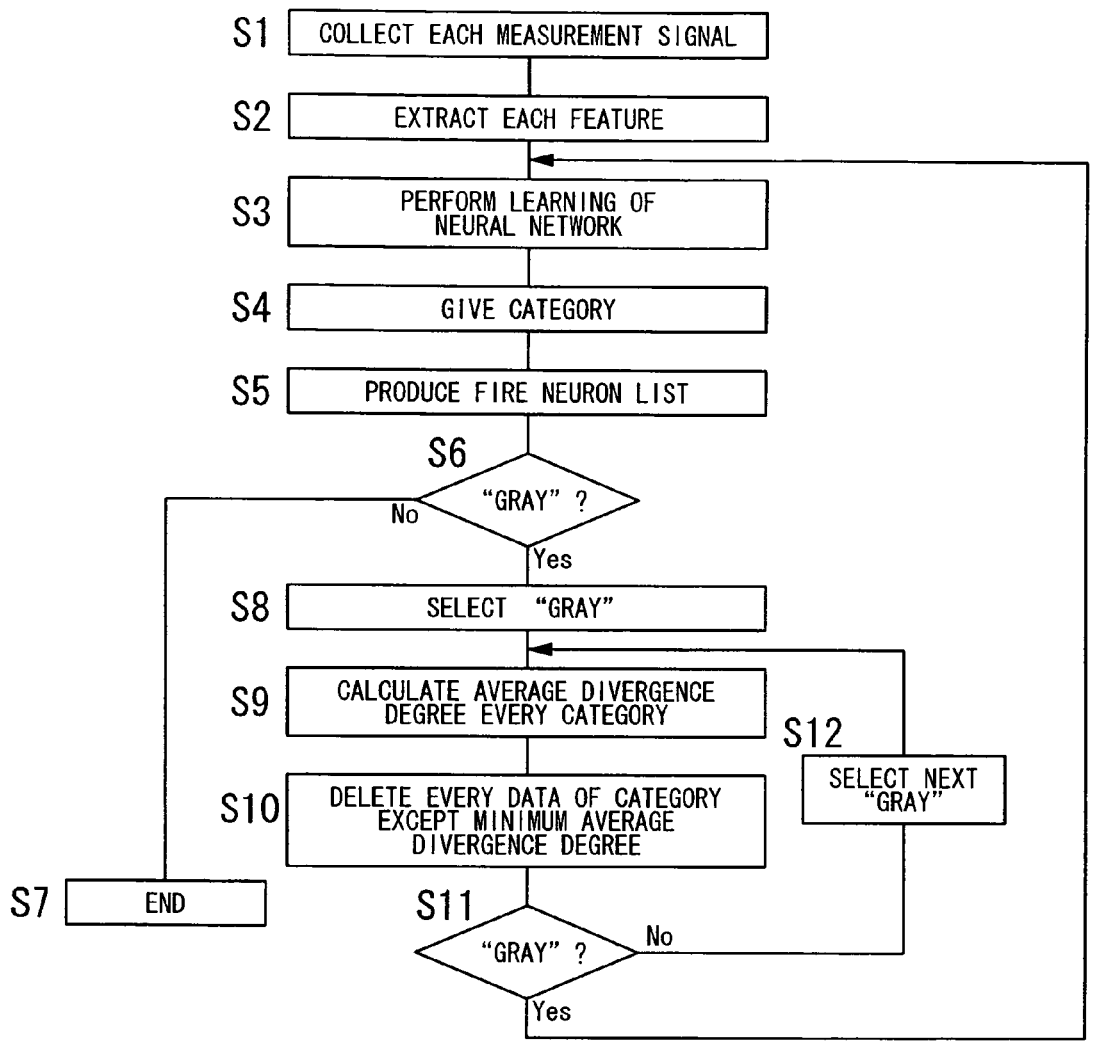
FIG. 4 is a flow chart of the selector.

The operation of the first embodiment is now explained with reference to FIG. 4. First, the preprocess (S1-S4) is explained. As shown in FIG. 4, the measuring device 10 collects a measurement signal from the apparatus 19 (S1), and the transducer 11 extracts a feature (feature data) from each measurement signal (S2). Each feature data are stored in the storage device 12. At this point, each feature data are assigned by a user or an administrator to either the category of good judgment or the category of no good judgment, which constitute a data set source. Subsequently, the source is used for a learning data set, and learning of the neural network 13 is performed based on the set (source) like the first to third prior arts (S3). The map generator 14 then produces a clustering map. At this point, each category related to the output layer 132 is provided for a corresponding element in the map (S4).

Next, the optimal method (S5-S12) is explained. The selector 15 combines an output neuron related to any category through each member (feature data) of the source in the preprocess with corresponding one or more members of the source, and thereby produces a fire neuron list of which each element is comprised of a combination of an output neuron and one or more members of the source (S5). The selector 15 then judges whether an output neuron of the output layer 132 is related to two categories based on the list. That is, the selector 15 judges whether or not the output neuron in question is "gray" (S6). If none of output neuron is "gray" after repeating the judgment, the selector 15 finishes the flow of FIG. 4 (S7).

At step S6, if the output neuron in question is "gray", the selector 15 calculates each member's divergence degree of the source corresponding to the two categories with respect to the output neuron, and calculates each average divergence degree of the two categories based on each member's divergence degree of the source (S8-S9). At step S10, the selector 15 leaves every member of the source corresponding to the category of the minimum average divergence degree, and also deletes every member of the source corresponding to every remaining category of the categories (two categories), i.e., every category except the minimum average divergence degree. The selector 15 then judges whether or not another output neuron of the output layer 132 is "gray" based on the list (S11). If said another output neuron is "gray", the selector 15 selects the output neuron of "gray" (S12), and returns to step S9. If none of output neuron is "gray", the selector 15 returns to step S3. At this time, a learning data set is selected from the optimized data set source, and accordingly the learning data set is optimized. Learning of the neural network 13 is then performed based on the optimized learning data set.

In the first embodiment, even if a member(s) of which category is wrong is included in the data set source, the member(s) can be deleted automatically. Accordingly, the learning data set can be optimized, and a proper category can be related to each output neuron of the output layer. As a result, judgment standard after learning can be prevent from being vague.

Figure 5:
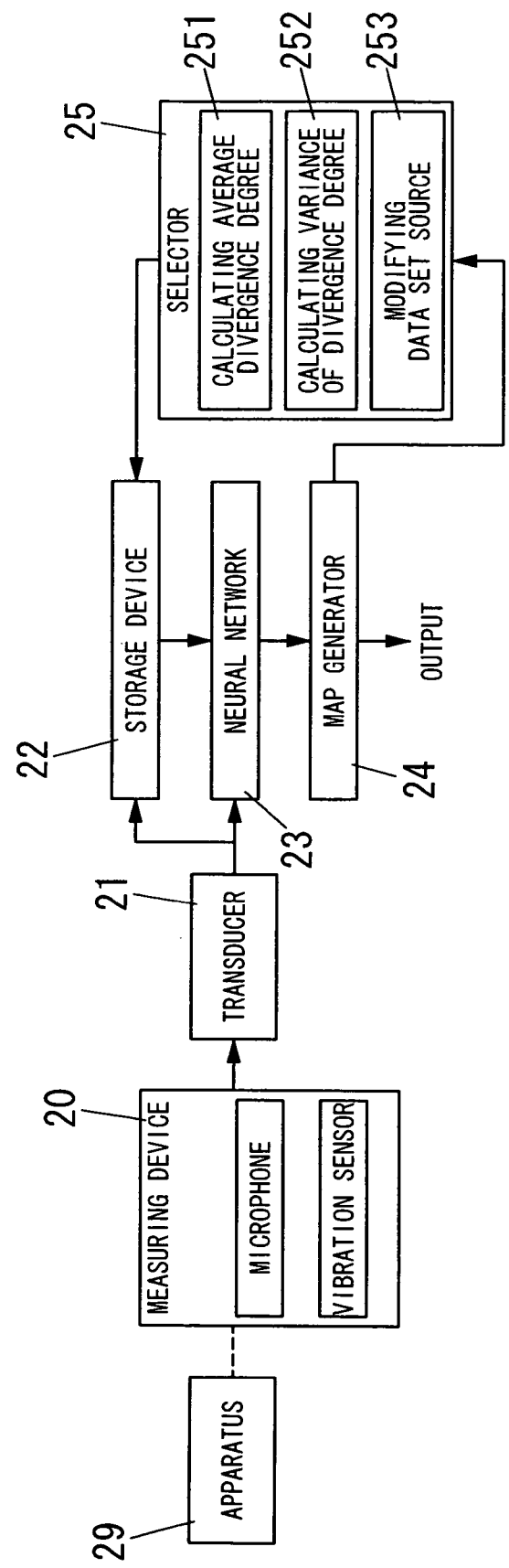
FIG. 5 is a block diagram of signal discrimination apparatus capable of optimizing a learning data set, in accordance with a second embodiment of the present invention.

FIG. 5 shows signal discrimination apparatus capable of optimizing a learning data set, in accordance with a second embodiment of the present invention. The apparatus has a measuring device 20, a transducer 21, a storage device 22, a neural network 23 and a map generator 24 like the first embodiment, and further has a selector 25 according to an aspect of the second embodiment.

The selector 25 is configured to select each member constituting a learning data set from a data set source. Each member of the source is feature data held by the storage device 22 and is assigned to any one of categories, in advance. In the second embodiment, every member of the source is to be assigned to the category of good judgment. In an alternate embodiment, every member of the source is to be assigned to either the category of good judgment or the category of no good judgment. By the way, good judgment of each member is not always proper. For example, because there is a possibility that environmental sound or sudden noise is included in any member (i.e., feature data).

Therefore, after a preprocess of sequentially entering every member of the source into the network 23 to try to relate each member of the source to any output neuron of the output layer of the network 23, the selector 25 performs a series of operations based on an optimal method for optimizing the learning data set.

Based on the optimal method, the selector 25 calculates each member's divergence degree of the source like the first embodiment. That is, the divergence degree is magnitude of difference vector between the weight vector on an output neuron related to the member in question and the member. The selector 25 then calculates average and variance of each member's divergence degree included in the source (251 and 252 in FIG. 5). The selector 25 then repeats the process of excluding an unsuitable member from the source until the average and variance of each member's divergence degree included in the source become lower than predetermined average threshold and variance threshold, respectively. In this process, the selector 25 excludes, from the source, every member of which divergence degree is greater than a predetermined divergence degree threshold (253 in FIG. 5). In the second embodiment, the selector 25 deletes every member of which divergence degree is greater than the divergence degree threshold. The average threshold, variance threshold and divergence degree threshold are set by a user.

The operation of the second embodiment is now explained with reference to FIG. 6. First, the selector 25 performs the preprocess in almost same way as the first embodiment (S21). At this point, each output neuron of the output layer of the network 23 is provided with weight vectors corresponding to the number of all the input neurons of the input layer. In addition, if some neurons of the output layer are not related to the category of good judgment by the data set source, each of them belongs to the category of no good judgment automatically.

The selector 25 afterwards performs a series of operations based on the optimal method (S22-S29). That is, the selector 25 calculates each member's divergence degree of the source (S22), and calculates average and variance of each member's divergence degree included in the source (S23). At step S24, the selector 25 judges whether the average is equal to or greater than the predetermined average threshold, or whether the variance is equal to or greater than the predetermined variance threshold. If the average and variance are less than the average threshold and variance threshold, respectively, the selector 25 judges that every member's category of the source is proper, and finishes the learning mode (S25).

If the average is equal to or greater than the average threshold or the variance is equal to or greater than the variance threshold, the selector 25 deletes, from the source, every member of which divergence degree is greater than the predetermined divergence degree threshold. That is, the selector 25 selects a member (feature data) from the source (S26), and judges whether or not the divergence degree of the member is greater than the divergence degree threshold (S27). If the divergence degree of the member is greater than the divergence degree threshold, the selector 25 deletes the member (S28), and proceeds to step S29. If the divergence degree of the member is equal to or less than the divergence degree threshold, the selector 25 leaves the member for the source and proceeds to step 29. At step S29, the selector 25 judges whether or not selection of every member from the source is finished. If the selection is finished, step S21 is returned to. If the selection is not finished, step S26 is returned to.

In the second embodiment, at least one member departing from the other members can be excluded from the data set source. For example, it is possible to exclude feature data that do not belong to the category of good judgment and feature data including environmental sound or noise. As a result, the learning data set can be optimized. In addition, after the completion of the learning mode based on the optimized learning data set, the signal discrimination apparatus can precisely classify quality of a measuring object in the inspecting mode.

In an alternate embodiment, the selector 25 repeats the process of excluding an unsuitable member from the source until average and variance of each member's divergence degree included in the source become equal to or lower than the average threshold and the variance threshold, respectively. The selector 25 also excludes, from the source, every member of which divergence degree is equal to or greater than the divergence degree threshold.

Figure 6:
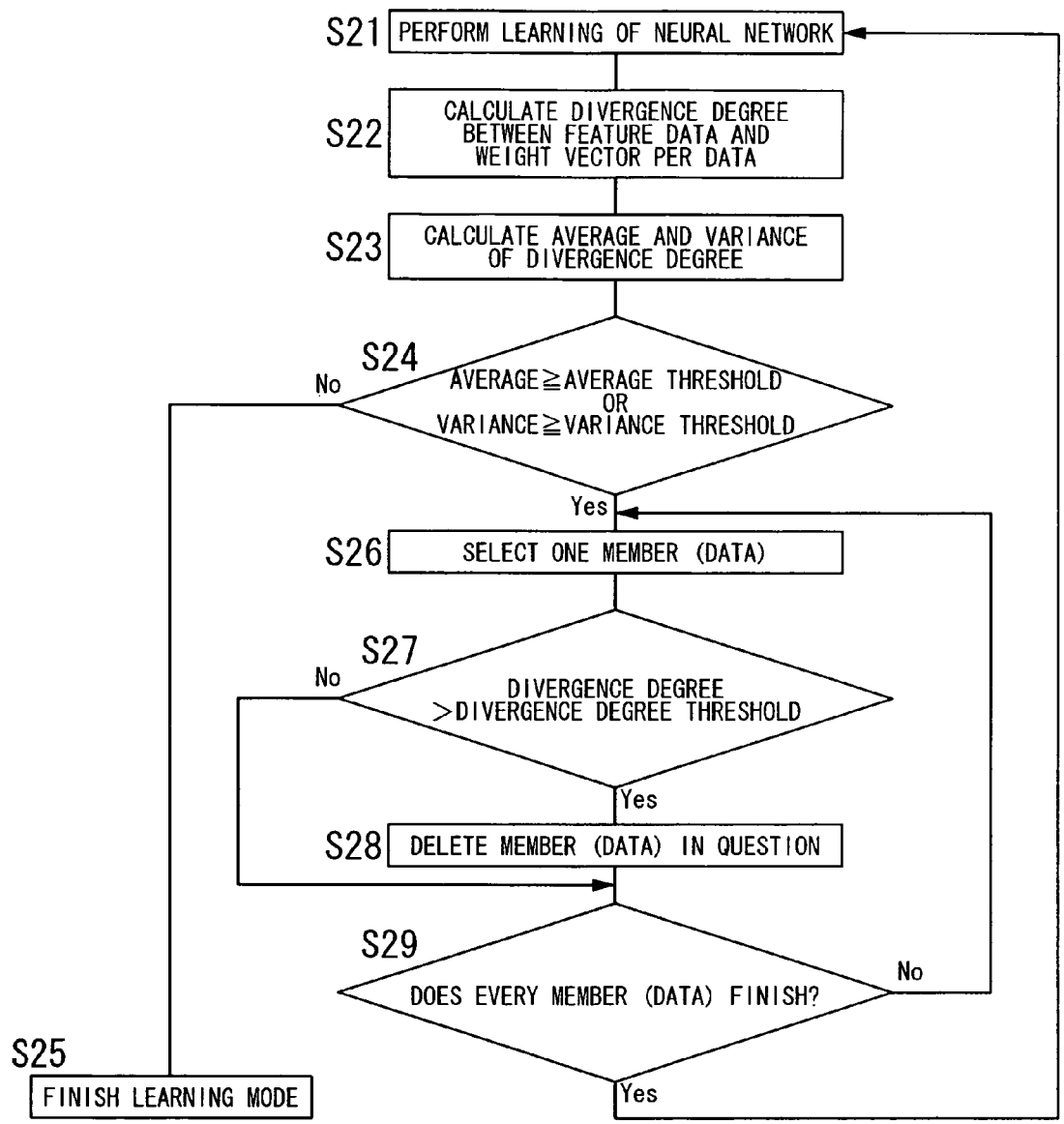
FIG. 6 is a flow chart of a selector in the apparatus of FIG. 5.
Figure 7:
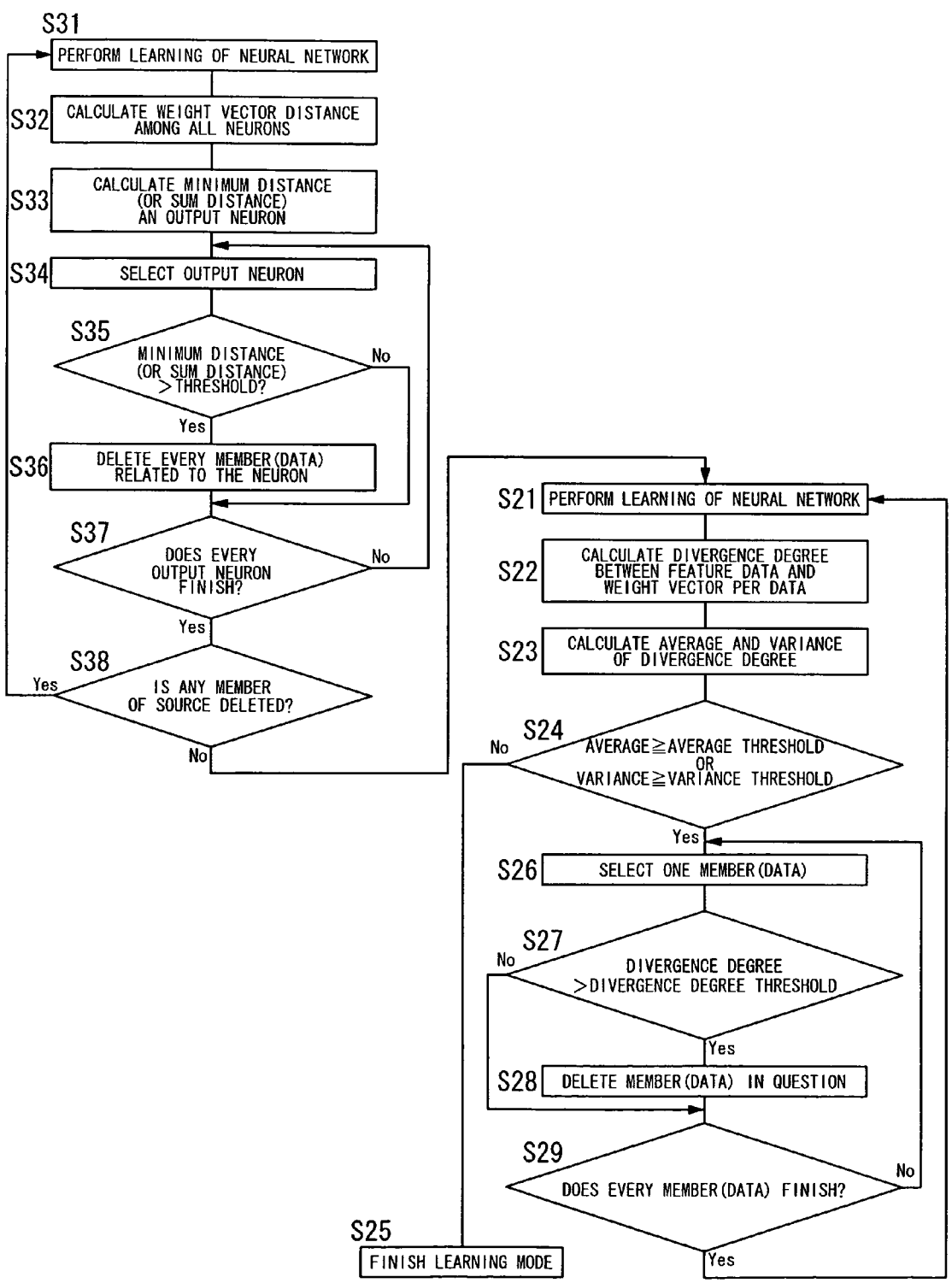
FIG. 7 is a flow chart of a selector in an enhanced embodiment.

In an enhanced embodiment, as shown in FIG. 7, the selector 25 is configured to further perform a first preprocess (S31-S38) prior to a second preprocess as the preprocess of FIG. 6 (S21). In the first preprocess, the selector 25 sequentially enters every member of the data set source into the neural network 23 to try to relate each member of the source to any output neuron of the output layer of the network 23. The selector 25 then calculates all distances between a weight vector on each output neuron of the output layer and a weight vector on each of the other output neurons. In the enhanced embodiment, each distance is obtained by squaring difference between weight vectors of two output neurons, and is equivalent to square of Euclid distance. The selector 25 then calculates a minimum distance per output neuron of the output layer based on all the calculated distances. In an alternate embodiment, the selector 25 calculates a sum distance instead of the minimum distance.

The selector 25 then excludes every member of the source that is related to every output neuron of which the minimum distance is greater than a predetermined minimum distance threshold. In the enhanced embodiment, said every member of the source is deleted. When the minimum distance of an output neuron is greater than the minimum distance threshold, a similarity level of categories between members of the source related to the output neuron is considered to be lower than a similarity level corresponding to the minimum distance threshold, and every member of the source related to the output neuron is excluded. Consequently, members of the source are more similar and accordingly are hard to be classified into a wrong category. In an alternate embodiment, the selector 25 excludes or deletes every member of the source that is related to every output neuron of which the sum distance is greater than a predetermined sum distance threshold. In this instance, when a sum distance of an output neuron is greater than the sum distance threshold, a variance level of categories between members of the source related to the output neuron is considered to be higher than a variance level corresponding to the sum distance threshold, and every member of the source related to the output neuron is excluded or deleted. Consequently, members of the source have lower variance characteristic and accordingly are hard to be classified into a wrong category. In another alternate embodiment, the selector 25 excludes or deletes every member of the source that is related to every output neuron of which minimum distance (or sum distance) is equal to or greater than the minimum distance threshold (or sum distance threshold).

The operation of the enhanced embodiment is now explained with reference to FIG. 7. At step S31, the selector 25 performs a preprocess like step S21 of FIG. 6. The selector 25 subsequently calculates all distances between a weight vector on each output neuron of the output layer of the network 23 and a weight vector on each of the other output neurons (S32). Each distance is, for example, square of Euclid distance. The selector 25 then calculates a minimum distance (or a sum distance) per output neuron of the output layer based on all the calculated distances (S33). The selector 25 then selects an output neuron from the output layer (S34). At step S35, the selector 25 judges whether or not the minimum distance (the sum distance) of the selected output neuron is greater than the minimum distance threshold (the sum distance threshold). If the minimum distance (the sum distance) is greater than the minimum distance threshold (the sum distance threshold), the selector 25 deletes every member of the source related to the selected output neuron (S36), and proceeds to step S37. If the minimum distance (sum distance) is equal to or less than the minimum distance threshold (sum distance threshold), the selector 25 leaves every member of the source related to the selected output neuron, and proceeds to step S37. At step S37, the selector 25 judges whether or not selection of every output neuron from the output layer is finished. If the selection is finished, step S38 is proceeded to. If the selection is not finished, step S34 is returned to. At step S38, the selector 25 judges whether or not any member of the source is not deleted in steps S34-S37. If any member of the source is not deleted, step S21 is proceeded to, and otherwise step S31 is returned to.

In the enhanced embodiment, when the minimum distance and the minimum distance threshold are utilized, it is possible to exclude every member of the source related to the category of good judgment that is lower than a similarity level corresponding to the minimum distance threshold. As a result, the feature data belonging to the category of no good can be prevented from being classified into the category of good judgment. When the sum distance and the sum distance threshold are utilized, it is possible to exclude every member of the source related to the category of good judgment that is higher than a variance level corresponding to the sum distance threshold. As a result, the feature data belonging to the category of no good can be prevented from being classified into the category of good judgment.

Figure 8:
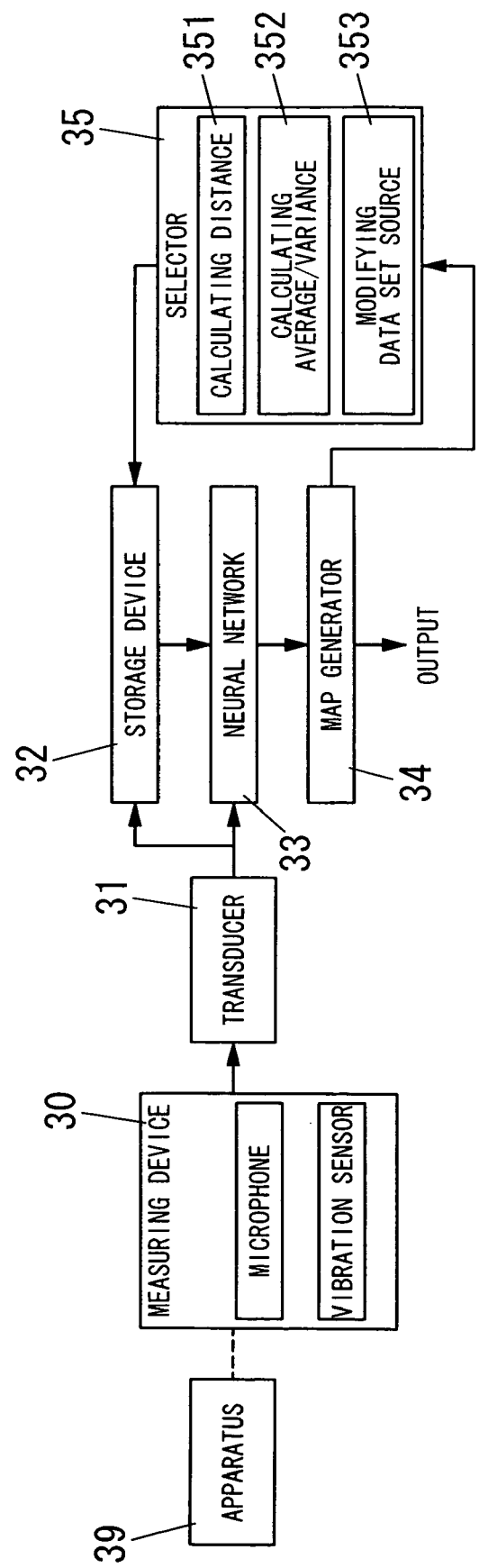
FIG. 8 is a block diagram of signal discrimination apparatus capable of optimizing a learning data set, in accordance with a third embodiment of the present invention.

FIG. 8 shows signal discrimination apparatus capable of optimizing a learning data set, in accordance with a third embodiment of the present invention. The apparatus has a measuring device 30, a transducer 31, a storage device 32, a neural network 33 and a map generator 34 like the first embodiment, and further has a selector 35 according to an aspect of the third embodiment.

The selector 35 is configured to select each member constituting a learning data set from a data set source without a preprocess (see S1-S4 in FIG. 4). Each member of the source is feature data held by the storage device 32 and is assigned to any one of categories, in advance. In the third embodiment, every member of the source is to be assigned to, for example, the category of good judgment. In an alternate embodiment, every member of the source is to be assigned to either the category of good judgment or the category of no good judgment.

The selector 35 calculates all distances between two members of the source with respect to every member of the source (351 in FIG. 8). In the third embodiment, each distance is obtained by squaring difference between weight vectors of two output neurons, and is equivalent to square of Euclid distance. The selector 35 then calculates a first average and a first variance of all the calculated distances (352 in FIG. 8). A repeat process is subsequently performed every member included in the source. In the repeat process, the selector 35 selects a member from the source to temporarily exclude the member from the source. With reference to every remaining member included in the source from which the member is excluded, the selector 35 then calculates all distances between two members of the source, and calculates a second average and a second variance of all the calculated distances (352 in FIG. 8).

Subsequently, if first magnitude or second magnitude are greater than predetermined first or second threshold, respectively and the first average and the first variance are greater than the second average and the second variance, respectively, the selector 35 excludes the member in question from the source (353 in FIG. 8), and sets the second average and the second variance to the first average and the first variance, respectively. The first magnitude is magnitude of change from the first average to the second average. The second magnitude is magnitude of change from the first variance to the second variance. If the first magnitude is greater than the first threshold, the possibility that the member in question is out of the category of good judgment is high. Similarly, if the second magnitude is greater than the second threshold, the possibility that the member in question is out of the category of good judgment is high. In addition, if the first average and the first variance are respectively greater than the second average and the second variance, the member in question raises the first average and the first variance and accordingly the possibility that the member in question is out of the category of good judgment is high. Therefore, by deleting the member in question, feature data belonging to the category of no good judgment can be prevented from being classified into the category of good judgment. In an alternate embodiment, if the first magnitude or the second magnitude are equal to or greater than the first or second threshold, respectively and the first average and the first variance are equal to or greater than the second average and the second variance, respectively, the selector 35 excludes the member in question from the source, and sets the second average and the second variance to the first average and the first variance, respectively.

If the first magnitude and the second magnitude are equal to or less than the first and second thresholds, respectively or the first average or the first variance are equal to or less than the second average or the second variance, respectively, the selector 35 returns the member in question to the source. In an alternate embodiment, if the first magnitude and the second magnitude are less than the first and second thresholds, respectively or the first average or the first variance are less than the second average or the second variance, respectively, the selector 35 returns the member in question to the source.

Figure 9:
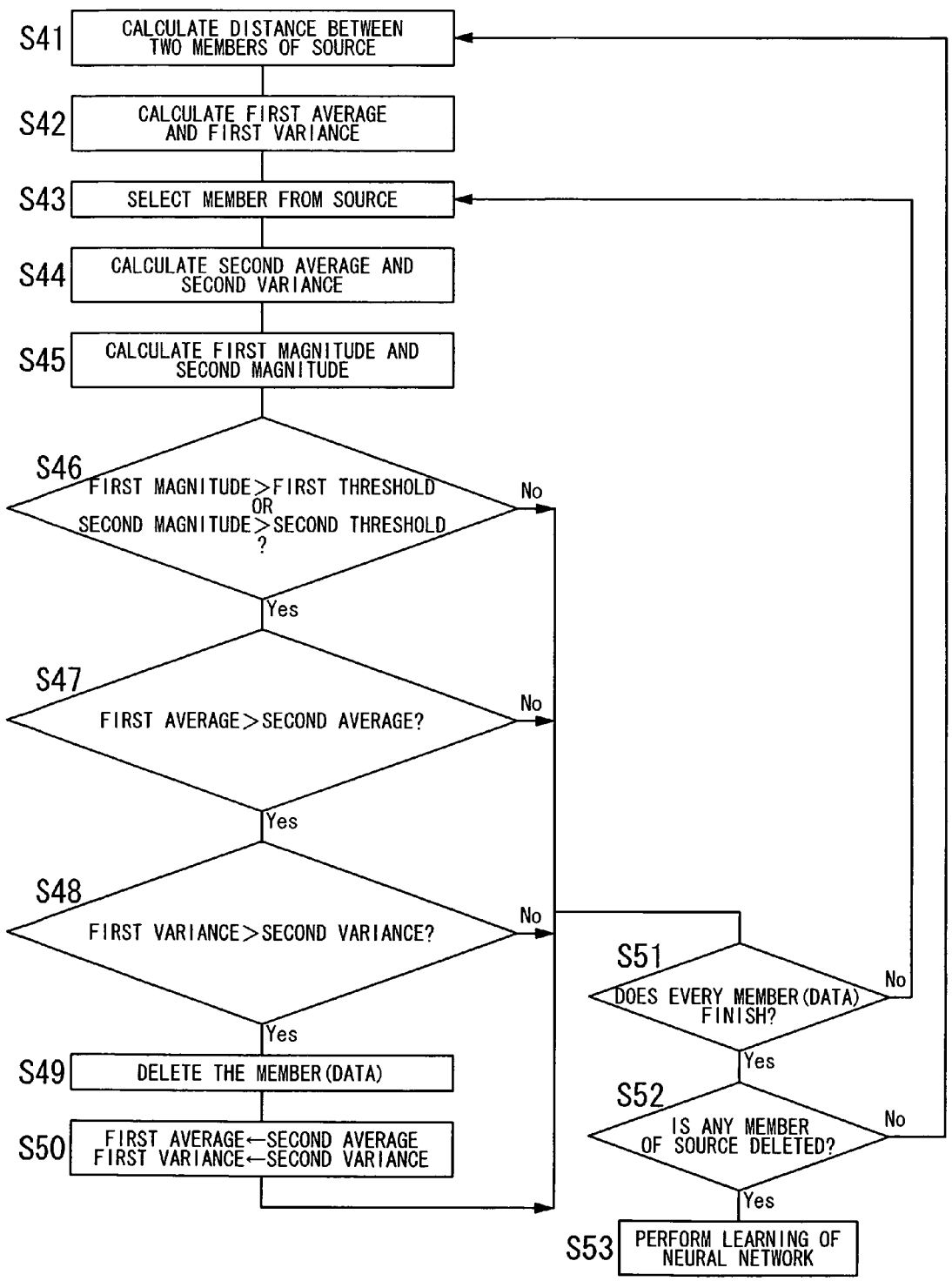
FIG. 9 is a flow chart of a selector in the apparatus of FIG. 8.

The operation of the third embodiment is now explained with reference to FIG. 9. The selector 35 calculates all distances between two members of the data set source with respect to all members of the source (S41). The selector 35 then calculates a first average and a first variance of all the calculated distances (S42). The selector 35 subsequently selects a member from the source to temporarily exclude the member from the source (S43). The selector 35 then calculates all distances between two members of the source from which the member is excluded, with respect to all remaining members included in the source, and calculates a second average and a second variance of all the calculated distances (S44). Afterwards, the selector 35 calculates magnitude of change from the first average to the second average (first magnitude) and magnitude of change from the first variance to the second variance (second magnitude). If the first magnitude or the second magnitude are greater than the first or second threshold, respectively and the first average and the first variance are greater than the second average and the second variance (S46-S48), respectively, the selector 35 excludes the member in question from the source (S49), and sets the second average and the second variance to the first average and the first variance, respectively (S50), and proceeds to step S51. The selector 35 otherwise returns the member in question to the source and proceeds to step 51. At step S51, the selector 35 judges whether or not selection of every member from the source is finished (S51). If the selection is finished, step S52 is proceeded to, and if the selection is not finished, step S43 is returned to. At step S52, the selector 35 judges whether or not any member of the source is not deleted in steps S43-S51. If any member of the source is not deleted, the selector 35 performs learning of the network 33 (S53), and proceeds to the next step (not shown). The selector 35 otherwise returns to step S41.

In the third embodiment, feature data belonging to the category of no good judgment can be prevented from being classified into the category of good judgment. As a result, the learning data set can be optimized. Learning of the neural network 33 can be also omitted from the process of optimizing the learning data, and accordingly processing speed is improved.

Figure 10:
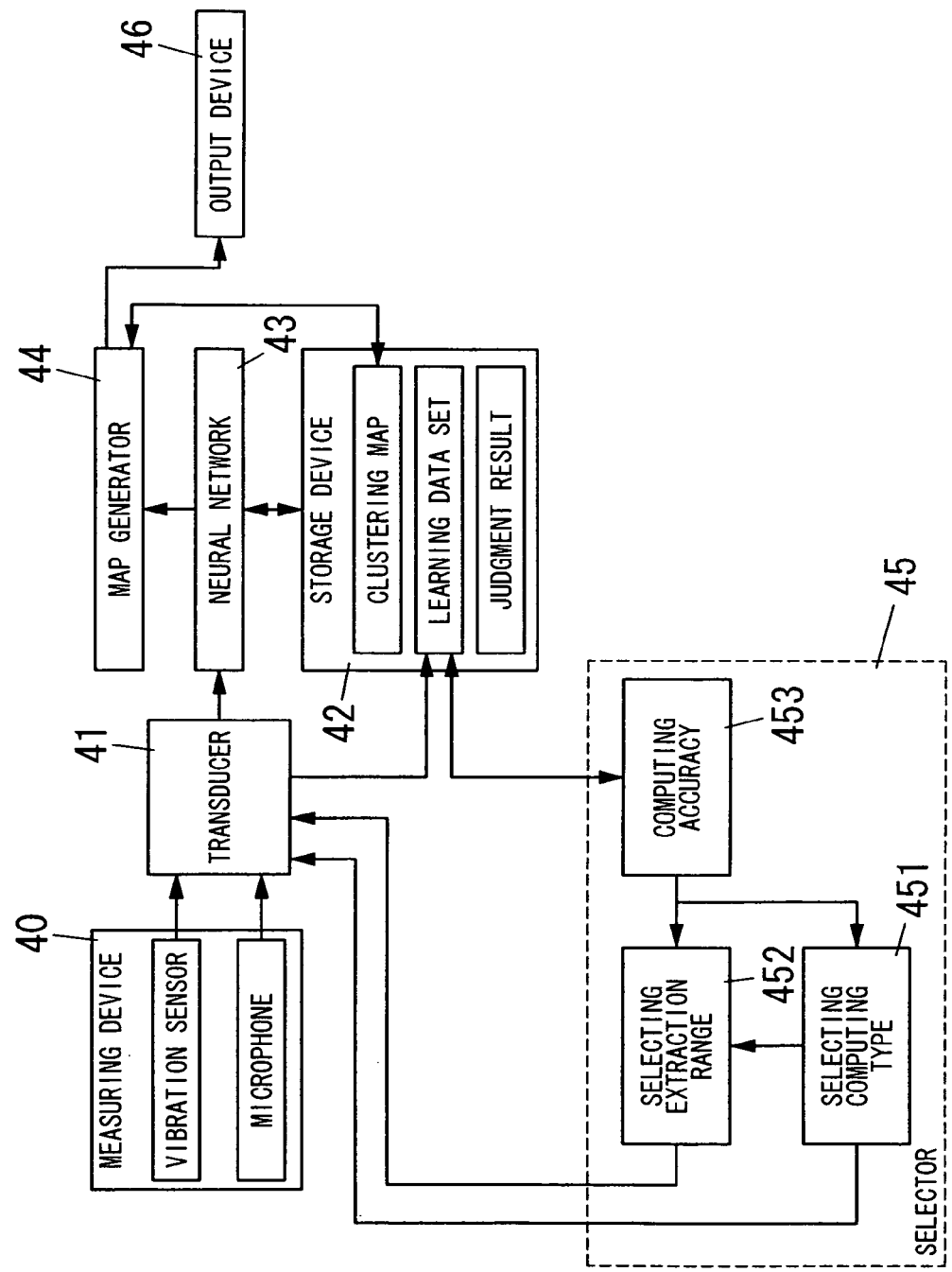
FIG. 10 is a block diagram of signal discrimination apparatus capable of optimizing a learning data set, in accordance with a fourth embodiment of the present invention.

FIG. 10 shows signal discrimination apparatus capable of optimizing a learning data set, in accordance with a fourth embodiment of the present invention. The apparatus has a measuring device 40, a transducer 41, a storage device 42, a neural network 43 and a map generator 44 like the first embodiment, and further has an output device 46 and a selector 45.

The transducer 41 is included in a signal processor formed of a filter (not shown) and a transducer in the same way as the first embodiment. Therefore, the filter of the fourth embodiment operates in any mode of a pass-through mode, an envelope mode, an FIR mode, a Wavelet transformation mode, a cepstrum mode and so on like the second prior art. The transducer 41 also operates in any mode of a projection wave form mode, an FFT mode, an FFT+Wavelet transformation mode, a probability density function mode, an effective value mode and so on to extract a feature (i.e., feature data) from the output of the filter. Each feature data are assigned to any one of categories by a user or an administrator. For example, in the fourth embodiment, each feature data are assigned to either the category of good judgment or the category of no good judgment. However, not limited to this, each feature data not assigned to the category of good judgment by the user or administrator may be assigned to the category of no good judgment automatically.

The output device 46 is, for example, a display device for displaying a clustering map and a position of category classified by the network 42 as well as alert screen, etc. The output device 46 may include a buzzer that sounds a warning, or the like.

The selector 45 is configured to optimize each feature obtained from the transducer 41 to optimize a learning data set, without learning (see S1-S4 of FIG. 4). The selector 45 selects an optimum computing type from different computing types (methods). The selector 45 also selects an optimum parameter combination from the parameter set used for the selected computing type of different parameter sets (factors such as variables entered into each input neuron of the network 43 or the like). Each of the different computing types is used to extract feature data from a measurement signal. That is, the different computing types include computing types used by the projection wave form mode, the FFT mode, the FFT+Wavelet transformation mode, the probability density function mode, the effective value mode and so on (see the second prior art). The different parameter sets are used for the different computing types. Each of the different parameter sets comprises different parameter combinations. The different parameter combinations may be prepared in advance, or produced by calculation.

On account of this, the selector 45 sequentially selects a computing type from the different computing types (451 in FIG. 10). Whenever a computing type is selected from the different computing types, the selector 45 estimates accuracy of category classification in case of each of different parameter combinations of the parameter set used for the selected computing type based on the selected computing type and the parameter combinations (452 and 453 in FIG. 10). At this point, the selector 45 sequentially selects a parameter combination from the parameter set used for the computing type, and estimates accuracy of category classification in case of each of the parameter combinations of the parameter set.

That is, based on the computing type in question and the parameter combination in question, the selector 45 extracts each feature data assigned to any one of the categories from each measurement signal through the transducer 41 to produce a data set for accuracy estimation. For example, as shown in FIG. 11A, first feature data (5, 6, 7, 8) and second feature data (9, 8, 8, 10) are extracted from the transducer 41 operating in the mode of the computing type in question (e.g., FFT mode). When each of them is assigned to the category of good judgment, the first feature data and the second feature data are included in the data set for accuracy estimation. Similarly, when third feature data (6, 7, 9, 12) and fourth feature data (7, 5, 11, 15) are extracted and each of them is assigned to the category of no good judgment, the third feature data and the fourth feature data are also included in the data set for accuracy estimation.

The selector 45 then produces a two-dimensional image by substantially arranging a category corresponding to each parameter of the data set for accuracy estimation along one axis and the other axis on a two-dimensional plane according to order and value of parameter, respectively. For example, as shown in FIG. 11B, the selector 45 arranges each first parameter of the data set for accuracy estimation in a first row of the two-dimensional plane in ascending order. Therefore, when the data set for accuracy estimation includes each feature data of FIG. 11A, the first parameters of the first feature data, the third feature data, the fourth feature data and the second feature data are arranged at first, second, third and fourth columns, respectively. Similarly, the selector 45 arranges each second parameter, each third parameter and each fourth parameter of the set in second, third and fourth rows of the two-dimensional plane in ascending order, respectively. Subsequently, as shown in FIG. 11C, the selector 45 produces the two-dimensional image by relating each parameter value to a corresponding category.

The selector 45 then estimates accuracy of category classification in case of the computing type in question and the parameter combination in question by calculating entropy on a category area corresponding to each element of the two-dimensional image. The accuracy is estimated by adding up entropy of a category area corresponding to every element of the two-dimensional image to calculate total TH. In the fourth embodiment, a category area is a cluster area in two-dimensional image. For example, when the unit length of a category area (length corresponding to one parameter) is "1", the length of, for example, first category area in the first row of the two-dimensional image in FIG. 11C becomes "1", and the length of second category area becomes "2". In this instance, said total TH is given by $$TH = \sum_{i=1}^{n} H(i)$$

$$= \sum_{i=1}^{n} \left( -\sum_{j=1}^{m} pi(j) \ln pi(j) \right)$$

$$= \sum_{i=1}^{n} \left( -\sum_{j=1}^{m} (L(i,j)/np) \ln(L(i,j)/np) \right),$$

where L(i, j) is length of the j-th category area in the i-th region of the two-dimensional image along the one axis (vertical axis) on the two-dimensional plane, np is the number of all members of the data set for accuracy estimation, m is the number of every category area in the i-th region, and n is the number of all regions of the two-dimensional image along the vertical axis. H(i) is entropy of every i-th parameter.

After estimating every accuracy, the selector 45 selects said optimum computing type and the parameter combination for the computing type by selecting the computing type and the parameter combination corresponding to the highest accuracy of every accuracy.

Figure 12:
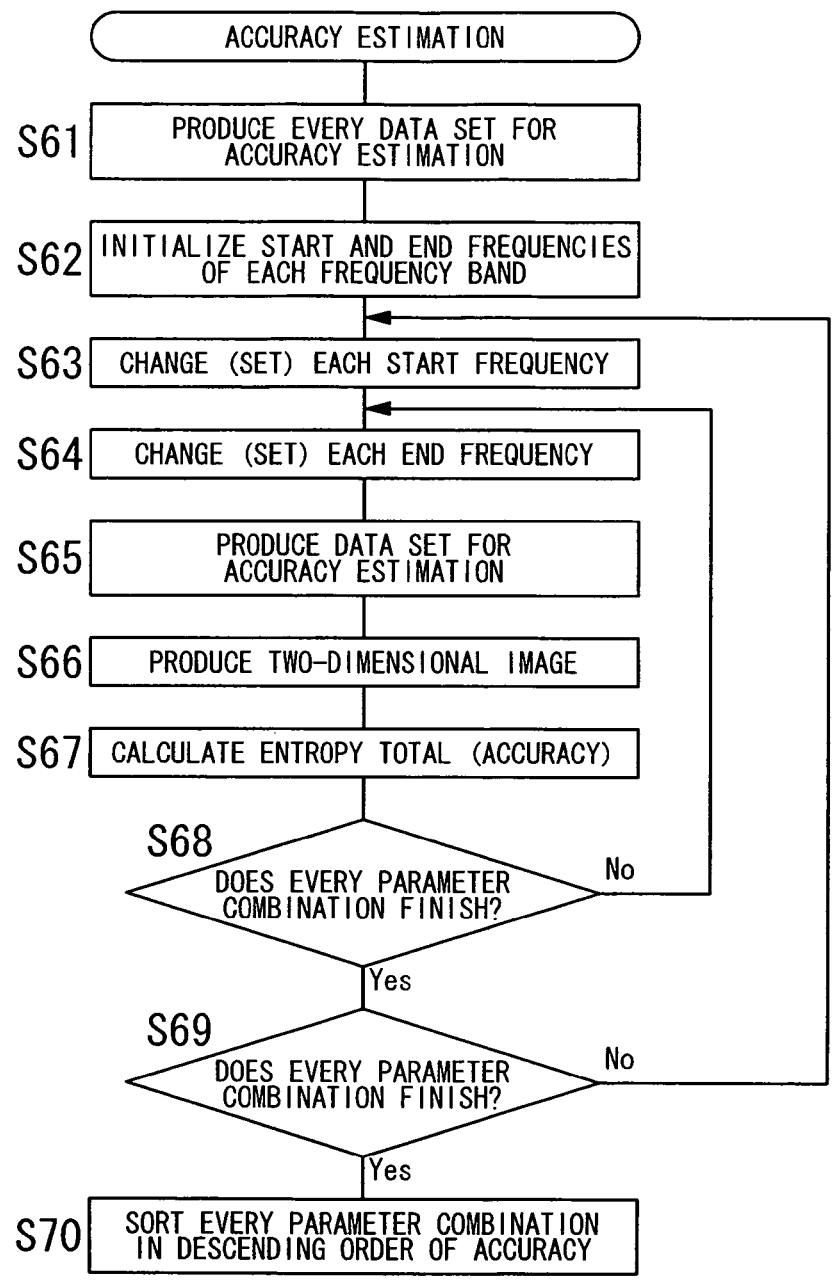
FIG. 12 is a flow chart of the selector.

The operation of the fourth embodiment is now explained with reference to FIG. 12. When selecting, e.g., FFT from the different computing types, the selector 45 performs a series of operations for selecting optimum parameter combination from, e.g., the parameter set of frequency bands as shown in FIG. 12. In case of FFT, every data set for accuracy estimation can be obtained in a lump, and accordingly the selector 45 produces every data set for accuracy estimation corresponding to the parameter set of frequency bands from each measurement signal through the transducer 41 (S61).

The selector 45 subsequently selects a parameter combination from the parameter set, and initializes each start and end frequencies of frequency bands based on the selected parameter combination (S62-S64). The number of the frequency bands is set to the number indicated by the selected parameter combination (e.g., the number of parameters), and each frequency of the frequency bands is set to a corresponding frequency indicated by the selected parameter combination.

Figure 13A:
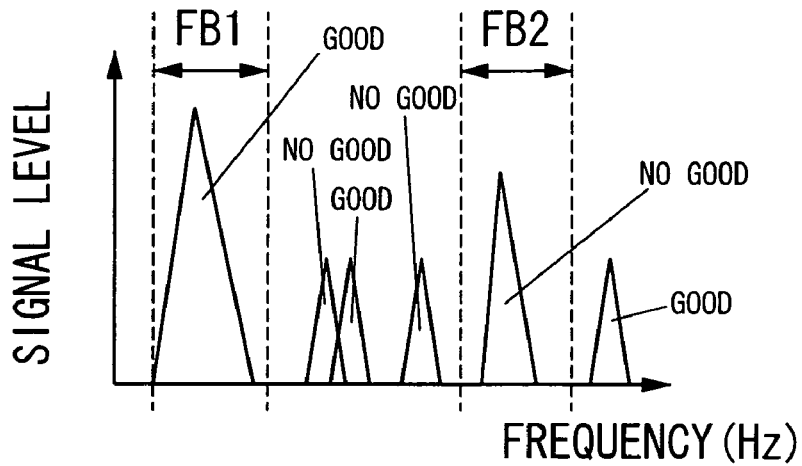
FIGS. 13A, 13B and 13C are explanatory diagrams of operation of the selector.
Figure 13B:
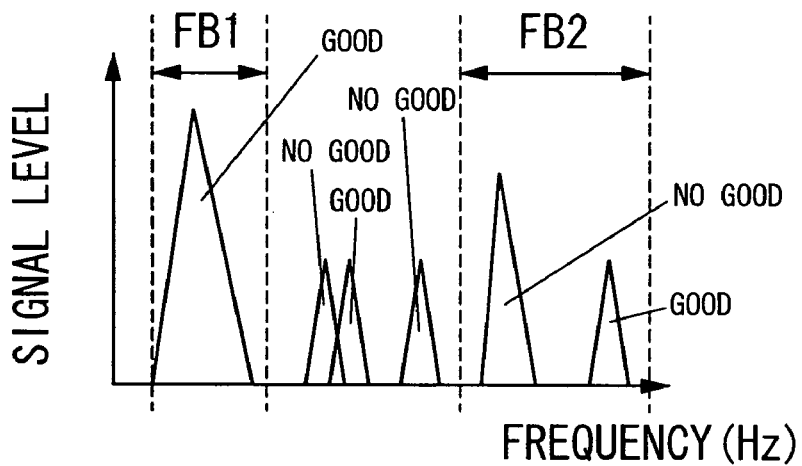
Figure 13C:
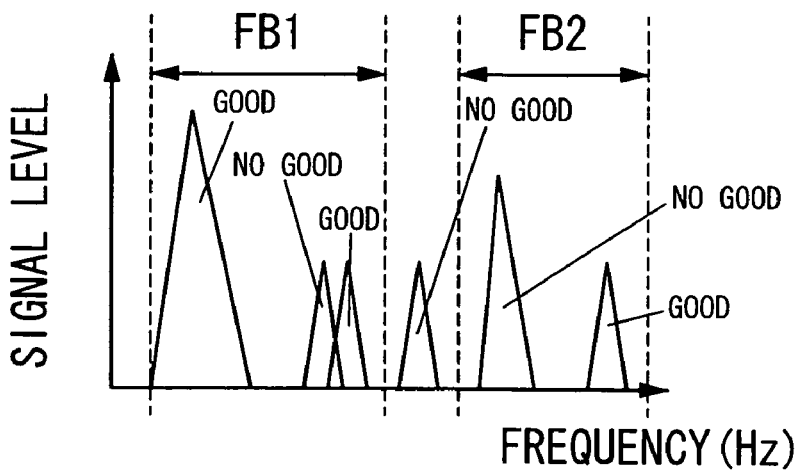
Figure 14:
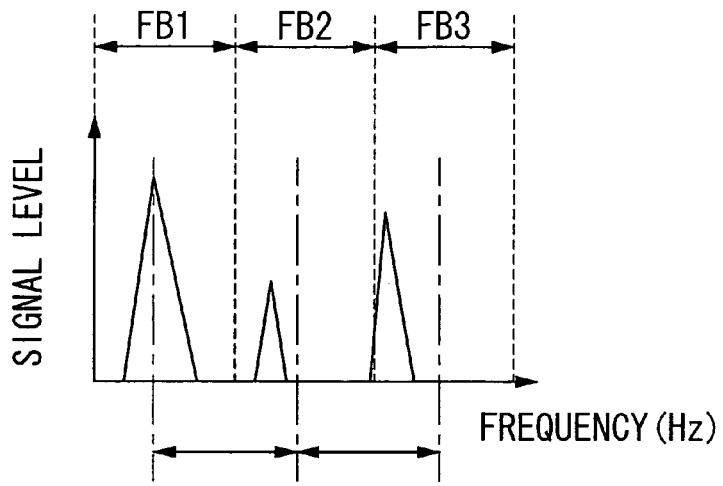
FIG. 14 is an explanatory diagram of operation of the selector.
Figure 15A:
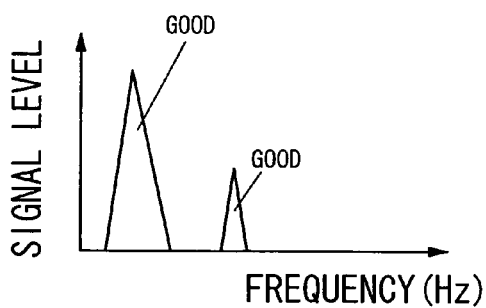
FIGS. 15A, 15B, 15C and 15D are explanatory diagrams of operation of the selector.
Figure 15B:
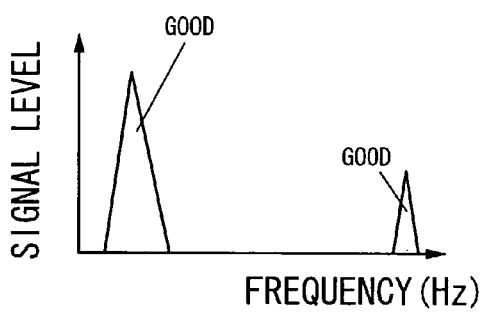
Figure 15C:
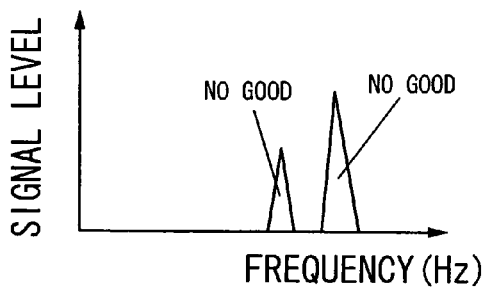
Figure 15D:
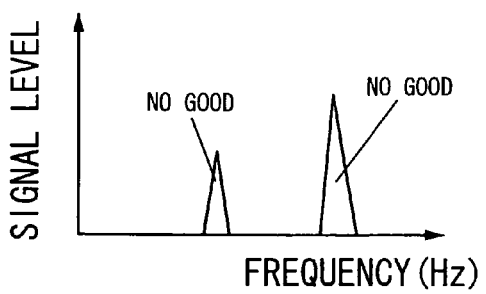

For example, as shown in FIGS. 13A-13C, when the number of the frequency bands is "2", the frequency bands are set to frequency bands FB1 and FB2. The lower limit of a start frequency of the band FB1 is 0 Hz, and the upper limit is one fourth of the maximum frequency set in response to a measuring signal. The lower limit of an end frequency of the band FB1 is one fourth of the maximum frequency, and the upper limit is three fourth of the maximum frequency. The lower limit of a start frequency of the band FB2 is one fourth of the maximum frequency, and the upper limit is three fourth of the maximum frequency. The lower limit of an end frequency of the band FB2 is three fourth of the maximum frequency, and the upper limit is the maximum frequency. As shown in FIG. 14, when the number of the frequency bands is "3", frequency bands FB1, FB2 and FB3 are set by trisecting the range from 0 Hz to the maximum frequency. In this instance, the lower limit of a start frequency of the center band FB2 is the center frequency of the left band FB1, and the upper frequency is the center frequency of the left band FB2. Also, the lower limit of an end frequency of the band FB2 is the center frequency of the band FB2, and the upper frequency is the center frequency of the right band FB3. Each of FIGS. 13A-13C shows each feature data of FIGS. 15A-15D in a lump. Each of FIGS. 15A and 15B shows feature data assigned to the category of good judgment, and each of FIGS. 15C and 15D shows feature data assigned to the category of no good judgment. In FIGS. 13A-13C, the accuracy of FIG. 13A is highest (high accuracy). Because the band FB1 only includes signal components corresponding to the category of good judgment, and the band FB2 only includes signal components corresponding to the category of no good judgment. On the contrary, the accuracy of FIG. 13C is lowest (low accuracy), because each of the bands FB1 and FB2 includes signal components corresponding to the categories of good judgment and no good judgment. The accuracy of FIG. 13B is middle accuracy.

At step S65, the selector 45 produces the data set for accuracy estimation corresponding to the selected parameter combination by extracting each member (feature data) corresponding to the selected parameter combination from every data set for accuracy estimation of step S61 based on the frequency bands. The selector 45 then produces a two-dimensional image form the set (S66), and estimates accuracy of category classification in case of the computing type in question and the parameter combination in question based on the two-dimensional image. That is, at step S67, the selector 45 calculates entropy total (TH).

In steps S68, S69, S63 and S64, until finishing selecting every parameter combination from the parameter set of frequency bands, the selector 45 changes each start frequency and each end frequency based on another parameter combination and then repeats steps S65-S67. In this instance, each start frequency and each end frequency are changed by each value in response to each parameter combination. In the example of FIG. 12, each start frequency is sequentially changed to different frequencies, and each end frequency with respect to each changed start frequency is sequentially changed to different frequencies (see FIGS. 13A-13C). At step S70, the selector 45 sorts every parameter combination of the parameter set of frequency bands in descending order of accuracy (total TH). The result is stored in the storage device 42 (see "judgment result" in FIG. 10).

Figure 16:
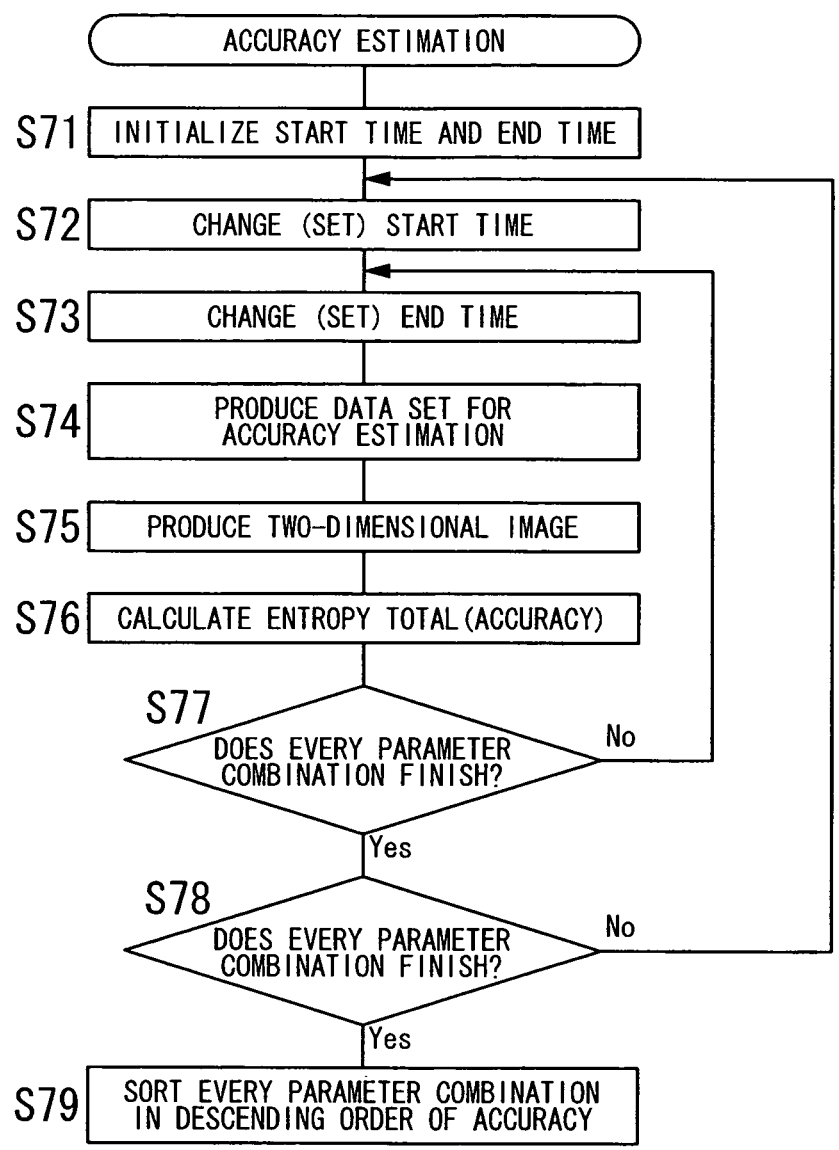
FIG. 16 is a flow chart of the selector.

Afterwards, when selecting, e.g., the projection wave form from the different computing types, the selector 45 performs a series of operations for selecting optimum parameter combination from, e.g., the parameter set for a window(s) of window function (time range) as shown in FIG. 16. That is, the selector 45 selects a parameter combination from the parameter set, and initializes start time and end time of the window based on the selected parameter combination (S71-S73). The selector 45 then produces a data set for accuracy estimation corresponding to the parameter combination from each measurement signal through the transducer 41 (S74). The selector 45 then produces a two-dimensional image from the set (S75), and estimates accuracy of category classification in case of the computing type in question and the parameter combination in question based on the two-dimensional image. That is, at step S76, the selector 45 calculates entropy total (TH). In steps S77, S78, S72 and S73, until finishing selecting every parameter combination from the parameter set, the selector 45 changes start time and end time based on another parameter combination and then repeats steps S74-S76. At step S79, the selector 45 sorts every parameter combination of the parameter set in question in descending order of accuracy (total TH). The result is stored in the storage device 42.

Figure 17:
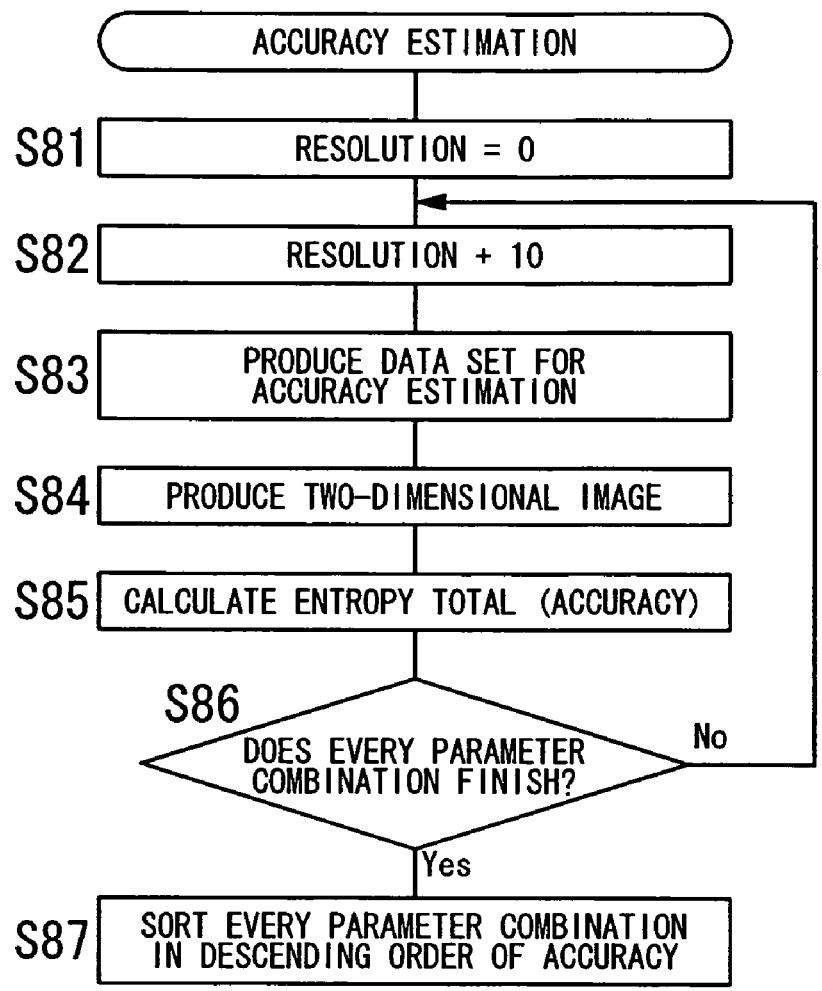
FIG. 17 is a flow chart of the selector.

Afterwards, when selecting, e.g., effective value form from the different computing types, the selector 45 performs a series of operations for selecting optimum parameter combination from, e.g., the parameter set for resolution as shown in FIG. 17. That is, the selector 45 selects a parameter combination from the parameter set, and initializes resolution based on the selected parameter combination (S81-S82). In the example of FIG. 17, the initial value is "10". The selector 45 then produces a data set for accuracy estimation corresponding to the parameter combination from each measurement signal through the transducer 41 (S83). The selector 45 then produces a two-dimensional image from the set (S84), and estimates accuracy of category classification in case of the computing type in question and the parameter combination in question based on the two-dimensional image. That is, at step S85, the selector 45 calculates entropy total (TH). In steps S86 and S82, until finishing selecting every parameter combination from the parameter set, the selector 45 changes resolution based on another parameter combination and then repeats steps S83-S85. At step S87, the selector 45 sorts every parameter combination of the parameter set in question in descending order of accuracy (total TH). The result is stored in the storage device 42.

After finish of selection of every computing type from the different computing types as well as selection of every parameter combination of each of every computing type, the selector 45 selects optimum computing type and the parameter combination for the computing type by selecting the computing type and the parameter combination corresponding to the highest accuracy of every accuracy.

In the fourth embodiment, the learning data set can be optimized by optimizing each feature data obtained from the transducer 41. As a result, as shown in FIGS. 18A-18C, "gray" elements caused by computing type and parameter combination can be deleted, and it is possible to produce a clustering map only formed of the category of good judgment and the category of no good judgment as shown in FIG. 18C.

In an alternate embodiment, a computing type is previously selected from the different computing types by a user or an administer. In this instance, the selector 45 estimates accuracy of category classification in case of each of the different parameter combinations of the parameter set used for the computing type based on the computing type and the parameter combinations. That is, based on the computing type in question and the parameter combination in question, the selector 45 extracting each feature data assigned to any one of the categories from each measurement signal through the transducer 41 to produce a data set for accuracy estimation. The selector 45 then produces a two-dimensional image by substantially arranging a category corresponding to each parameter of the data set for accuracy estimation along one axis and the other axis on a two-dimensional plane according to order and value of parameter, respectively. The selector 45 then estimates accuracy of category classification in case of the computing type in question and the parameter combination in question by calculating entropy on a category area corresponding to each element of the two-dimensional image. The accuracy is given by said total TH. After every accuracy is estimated, the selector 45 selects said optimum parameter combination by selecting the parameter combination corresponding to the highest accuracy of every accuracy.

Although the present invention has been described with reference to certain preferred embodiments, numerous modifications and variations can be made by those skilled in the art without departing from the true spirit and scope of this invention.

The invention claimed is:

1. A selection method of learning data set for signal discrimination apparatus, said method being used for the signal discrimination apparatus comprising:
    a transducer for extracting feature data including parameters from a measurement signal; and
    a competitive learning neural network, including an input layer with input neurons and an output layer with output neurons, said input neurons corresponding one-on-one to the parameters of feature data extracted through the transducer, each of said output neurons being, based on a learning data set, coupled to all input neurons of the input layer through weight vectors to be related to any of categories, said network being configured to relate feature data extracted through the transducer to any output neuron of the output layer to classify into any of the categories;
    wherein the method is processed by a selector, further included in the apparatus, for selecting each member constituting said learning data set from a data set source of which each member is feature data extracted through the transducer and is assigned to any one of the categories, in advance,
    the method comprising a step (A) performed after a pre-process of sequentially entering every member of the source into the network to try to relate each member of the source to any output neuron of the output layer, said step (A) being repeated until each output neuron of the output layer is related to a single category of the categories,
    the step (A) comprising steps of
    (a) judging whether an output neuron of the output layer is related to different categories in all categories represented by the output layer;
    (b) calculating each member's divergence degree of the source corresponding to the different categories with respect to the output neuron in question if related to the different categories;
    (c) calculating each average divergence degree of the different categories based on said each member's divergence degree of the source;
    (d) including every member of the source corresponding to the category of the minimum average divergence degree in the selection from the source to the learning data set; and (e) excluding every member of the source corresponding to every remaining category of the different categories from the selection.

2. The selection method of learning data set for signal discrimination apparatus of claim 1, wherein each member's divergence degree of the source at the step (b) is magnitude of difference vector between the weight vector on the output neuron in question and the member in question.

* * * * *